(12) United States Patent
Liu et al.

(10) Patent No.: US 11,893,302 B2
(45) Date of Patent: Feb. 6, 2024

(54) CONTENT TRANSMISSION METHOD AND TERMINAL DEVICE

(71) Applicant: Huawei Technologies Co., Ltd., Shenzhen (CN)

(72) Inventors: Wujian Liu, Wuhan (CN); Guoqiang Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/732,145

(22) Filed: Apr. 28, 2022

(65) Prior Publication Data

US 2022/0261205 A1 Aug. 18, 2022

Related U.S. Application Data

(63) Continuation of application No. PCT/CN2020/120794, filed on Oct. 14, 2020.

(30) Foreign Application Priority Data

Oct. 30, 2019 (CN) .......................... 201911047829.6

(51) Int. Cl.
*G06F 3/14* (2006.01)
*H04W 4/80* (2018.01)
*H04L 67/06* (2022.01)

(52) U.S. Cl.
CPC ............ *G06F 3/1454* (2013.01); *H04L 67/06* (2013.01); *H04W 4/80* (2018.02)

(58) Field of Classification Search
CPC ..................................................... G06F 3/1454
See application file for complete search history.

(56) References Cited

U.S. PATENT DOCUMENTS

| | | |
|---|---|---|
| 2011/0081923 A1 | 4/2011 | Forutanpour et al. |
| 2012/0042102 A1 | 2/2012 | Chung et al. |
| 2013/0124617 A1 | 5/2013 | Lee et al. |
| 2014/0359454 A1 | 12/2014 | Lee et al. |
| 2016/0105859 A1 | 4/2016 | Zhu |
| 2016/0188798 A1 | 6/2016 | Hayter et al. |
| 2018/0041553 A1 | 2/2018 | Shiro |
| 2018/0075265 A1 | 3/2018 | Zhu et al. |

(Continued)

FOREIGN PATENT DOCUMENTS

| | | |
|---|---|---|
| CN | 110224920 A | 9/2010 |
| CN | 102377877 A | 3/2013 |

(Continued)

*Primary Examiner* — Gustavo Polo
(74) *Attorney, Agent, or Firm* — Conley Rose, P.C.

(57) ABSTRACT

A content transmission method includes obtaining, by a first terminal device, a first instruction instructing the first terminal device to perform content transmission with a second terminal device sending, by the first terminal device, to the second terminal device, and in response to the first instruction, first information instructing the second terminal device to determine that that the first terminal device transmits content to the second terminal device. Receiving, by the first terminal device, content transmission direction indication information from the second terminal device, determining, by the first terminal device, first content, and sending, by the first terminal device, the first content to the second terminal device to display the first content.

20 Claims, 17 Drawing Sheets

(56) References Cited

U.S. PATENT DOCUMENTS

2018/0352405 A1* 12/2018 Fujita ..................... H04W 4/80
2020/0076876 A1    3/2020 Zhang
2022/0261205 A1    8/2022 Liu et al.

FOREIGN PATENT DOCUMENTS

| CN | 104488199 A | 4/2015 |
| CN | 104834617 A | 8/2015 |
| CN | 104836650 A | 8/2015 |
| CN | 107564996 A | 1/2018 |
| CN | 108563594 A | 9/2018 |
| CN | 108702602 A | 10/2018 |
| CN | 111062224 A | 4/2020 |

* cited by examiner

CONTENT TRANSMISSION METHOD AND TERMINAL DEVICE

CROSS-REFERENCE TO RELATED APPLICATIONS

This is a continuation of International Patent Application No. PCT/CN2020/120794 filed on Oct. 14, 2020, which claims priority to Chinese Patent Application No. 201911047829.6 filed on Oct. 30, 2019. The disclosures of the aforementioned applications are hereby incorporated by reference in their entireties.

TECHNICAL FIELD

Embodiments of this disclosure relate to the field of computer technologies, and in particular, to a content transmission method and a terminal device.

BACKGROUND

With rapid development of the mobile Internet, there is a requirement for content transmission between a mobile phone and a personal computer (PC). The content includes but is not limited to a picture, a video, and a file. However, most of current manners in which content can be transmitted between a mobile phone and a PC are not satisfactory, such as a data cable connection, social software, installation of third-party transfer software, and file transfer through various cloud services. These transmission manners depend more or less on factors such as a data cable, a third-party application, and a network. In addition, the content can be transmitted between the mobile phone and the PC only when a plurality of operations is performed. Consequently, efficiency is low.

To resolve the foregoing technical problem, the following method for content transmission between a mobile phone and a PC includes that the mobile phone has a near-field communication (NFC) function, an NFC tag is set on the PC, and a media access control (MAC) address of the PC is burnt in the NFC tag. After touching the NFC tag set on the PC in an NFC function area of the mobile phone, the mobile phone may obtain the MAC address of the PC, so that the mobile phone can establish a link with a BLUETOOTH (BT) module of the PC by using the BT module. This implements content transmission between the mobile phone and the PC through BT transmission or WI-FI.

However, the foregoing content transmission method between the mobile phone and the PC needs to depend on the NFC function of the mobile phone, and requires that the NFC tag be set on the PC. In other words, the method is not applicable to a terminal device that does not have an NFC function or a terminal device on which no NFC tag is set.

SUMMARY

Embodiments of this disclosure provide a content transmission method and a terminal device, which do not need to depend on an NFC function of the terminal device, and do not need to set an NFC tag on the terminal device. This achieves good applicability and high transmission efficiency.

According to a first aspect, an embodiment of this disclosure provides a content transmission method, including that a first terminal device obtains a first instruction, where the first instruction indicates that the first terminal device needs to perform content transmission with another terminal device. The first terminal device sends first information to a second terminal device in response to the first instruction, where the first information is used by the second terminal device to determine that a content transmission direction is that the first terminal device transmits content to the second terminal device. The first terminal device receives content transmission direction indication information from the second terminal device. The first terminal device determines first content, and sends the first content to the second terminal device, so that the second terminal device displays the first content. Optionally, the first content is a first interface presented by the first terminal device, or the first content is content in the first interface. Further, the first content is content that is in the first interface and that is most recently operated.

This solution provides a specific implementation in which the first terminal device transmits content to the second terminal device. In this solution, the first terminal device triggers a content transmission process by obtaining an instruction, without depending on an NFC function of a mobile phone, or setting an NFC tag on a PC, which achieves excellent applicability. In addition, the content transmission method in embodiments of this disclosure does not depend on a third-party application, social software, or a data cable. In this case, content transmission is highly efficient and easy to implement.

In addition, in this solution, the first terminal device determines to-be-transmitted content, and the second terminal device determines a content transmission direction. This improves content transmission efficiency, reduces user intervention, and improves user experience.

In a possible implementation, the first information includes status information of a first interface presented by the first terminal device, and the status information of the first interface includes at least one of a type of the first interface or a time at which the first interface is most recently operated.

In this solution, the first information includes the type of the first interface and the time at which the first interface is most recently operated, so that the second terminal device determines the content transmission direction based on the type of the first interface and the time at which the first interface is most recently operated. In addition, in this solution, the first information includes no content transmission indication information, so that signaling overheads can be reduced.

In a possible implementation, the first information further includes content transmission indication information, and the content transmission indication information indicates that content transmission needs to be performed between the second terminal device and the first terminal device.

The first information in this solution carries the indication information indicating that content transmission needs to be performed between the second terminal device and the first terminal device, so that the second terminal device can clearly determine that the first terminal device needs to perform content transmission with the second terminal device. This improves reliability of the content transmission process.

In a possible implementation, that a first terminal device obtains a first instruction includes that the first terminal device triggers the first instruction based on an operation of controlling, by a user, the second terminal device to perform an operation on the first terminal device, or the first terminal device triggers the first instruction based on an operation performed by a user on the first terminal device, or the first terminal device receives the first instruction entered by a user into the first terminal device.

The foregoing manner of obtaining the first instruction is simple and easy to implement, and improves content transmission efficiency and user experience.

In a possible implementation, that the first terminal device triggers the first instruction based on an operation of controlling, by a user, the second terminal device to perform an operation on the first terminal device includes that the first terminal device obtains an operation of controlling, by the user, the second terminal device to touch a first location of the first terminal device. The first terminal device triggers the first instruction if a capacitance value change characteristic of the first location that is caused by the operation matches a preset capacitance value change characteristic.

This solution provides a specific implementation of triggering the first instruction based on the operation of controlling, by the user, the second terminal device to perform an operation on the first terminal device.

According to a second aspect, an embodiment of this disclosure provides a content transmission method, including that a second terminal device receives first information from a first terminal device. The second terminal device determines, based on the first information, that a content transmission direction is that the first terminal device transmits content to the second terminal device. The second terminal device sends content transmission direction indication information to the first terminal device, where the content transmission direction indication information indicates the first terminal device to transmit content to the second terminal device. The second terminal device receives first content from the first terminal device. The second terminal device displays the first content. Optionally, the first content is a first interface presented by the first terminal device, or the first content is content in the first interface. Further, the first content is content that is in the first interface and that is most recently operated.

This solution provides a specific implementation in which the first terminal device transmits content to the second terminal device. In this solution, the second terminal device determines, based on content transmission indication information, to start a content transmission process, without depending on an NFC function of a mobile phone, or setting an NFC tag on a PC, which achieves excellent applicability. In addition, the content transmission method in embodiments of this disclosure does not depend on a third-party application, social software, or a data cable. In this case, content transmission is highly efficient and easy to implement.

In addition, in this solution, the first terminal device determines to-be-transmitted content, and the second terminal device determines a content transmission direction. This improves content transmission efficiency, reduces user intervention, and improves user experience.

In a possible implementation, the first information includes status information of a first interface presented by the first terminal device, and the status information of the first interface includes at least one of a type of the first interface or a time at which the first interface is most recently operated.

In this solution, the first information includes the type of the first interface and the time at which the first interface is most recently operated, so that the second terminal device determines the content transmission direction based on the type of the first interface and the time at which the first interface is most recently operated. In addition, in this solution, the first information includes no content transmission indication information, so that signaling overheads can be reduced.

In a possible implementation, the first information further includes content transmission indication information, and the content transmission indication information indicates that content transmission needs to be performed between the second terminal device and the first terminal device.

The first information in this solution carries the indication information indicating that content transmission needs to be performed between the second terminal device and the first terminal device, so that the second terminal device can clearly determine that the first terminal device needs to perform content transmission with the second terminal device. This improves reliability of the content transmission process.

In a possible implementation, that the second terminal device determines, based on the first information, that a content transmission direction is that the first terminal device transmits content to the second terminal device includes that the second terminal device determines, based on the first information, that a type of the first interface is different from a type of a second interface presented by the second terminal device, a priority of the type of the first interface is the same as a priority of the type of the second interface, and a first time at which the first interface is most recently operated is later than a second time at which the second interface is most recently operated. The second terminal device determines that the content transmission direction is that the first terminal device transmits content to the second terminal device. Alternatively, the second terminal device determines, based on the first information, that a type of the first interface is different from a type of a second interface presented by the second terminal device, and a priority of the type of the first interface is higher than a priority of the type of the second interface. The second terminal device determines that the content transmission direction is that the first terminal device transmits content to the second terminal device. Alternatively, the second terminal device determines, based on the first information, that a type of the first interface is the same as a type of the second interface, and a first time at which the first interface is most recently operated is later than a second time at which the second interface is most recently operated. The second terminal device determines that the content transmission direction is that the first terminal device transmits content to the second terminal device.

This solution provides a specific implementation of determining, based on the first information, that the content transmission direction is that the first terminal device transmits content to the second terminal device.

In a possible implementation, before the second terminal device determines, based on the first information, that the content transmission direction is that the first terminal device transmits content to the second terminal device, the method further includes that the second terminal device determines that the second terminal device moves in a preset mode within preset duration before a receiving time of the first information.

In this solution, after receiving the content transmission indication information, the second terminal device determines whether the second terminal device is a terminal that needs to perform content transmission with the first terminal device. This ensures normal content transmission.

According to a third aspect, an embodiment of this disclosure provides a content transmission method, including that a first terminal device obtains a first instruction, where the first instruction indicates that the first terminal device needs to perform content transmission with another terminal device. The first terminal device sends first information to a second terminal device in response to the first instruction, where the first information is used by the second terminal device to determine that a content transmission direction is that the second terminal device transmits content to the first terminal device. The first terminal device receives second content from the second terminal device. The first terminal device displays the second content. Optionally, the second content is a second interface presented by the second terminal device, or the second content is content in the second interface. Further, the second content is content that is in the second interface and that is most recently operated.

This solution provides a specific implementation in which the second terminal device transmits content to the first terminal device. In this solution, the first terminal device triggers a content transmission process by obtaining an instruction, without depending on an NFC function of a mobile phone, or setting an NFC tag on a PC, which achieves excellent applicability. In addition, the content transmission method in embodiments of this disclosure does not depend on a third-party application, social software, or a data cable. In this case, content transmission is highly efficient and easy to implement.

In addition, in this solution, the second terminal device determines to-be-transmitted content and a content transmission direction. This improves content transmission efficiency, reduces user intervention, and improves user experience.

In a possible implementation, the first information includes status information of a first interface presented by the first terminal device, and the status information of the first interface includes at least one of a type of the first interface or a time at which the first interface is most recently operated.

For beneficial effects of this solution, refer to effects of corresponding implementations of the first aspect. Details are not described herein again.

In a possible implementation, the first information further includes content transmission indication information, and the content transmission indication information indicates that content transmission needs to be performed between the second terminal device and the first terminal device.

For beneficial effects of this solution, refer to effects of corresponding implementations of the first aspect. Details are not described herein again.

In a possible implementation, that a first terminal device obtains a first instruction includes that the first terminal device triggers the first instruction based on an operation of controlling, a user, the second terminal device to perform an operation on the first terminal device, or the first terminal device triggers the first instruction based on an operation performed by a user on the first terminal device, or the first terminal device receives the first instruction entered by a user into the first terminal device.

For beneficial effects of this solution, refer to effects of corresponding implementations of the first aspect. Details are not described herein again.

In a possible implementation, that the first terminal device triggers the first instruction based on an operation of controlling, by a user, the second terminal device to perform an operation on the first terminal device includes that the first terminal device obtains an operation of controlling, by the user, the second terminal device to touch a first location of the first terminal device. The first terminal device triggers the first instruction if a capacitance value change characteristic of the first location that is caused by the operation matches a preset capacitance value change characteristic.

For beneficial effects of this solution, refer to effects of corresponding implementations of the first aspect. Details are not described herein again.

According to a fourth aspect, an embodiment of this disclosure provides a content transmission method, including that a second terminal device receives first information from a first terminal device. The second terminal device determines, based on the first information, that a content transmission direction is that the second terminal device transmits content to the first terminal device. The second terminal device determines second content, and sends the second content to the first terminal device, so that the first terminal device displays the second content. Optionally, the second content is a second interface presented by the second terminal device, or the second content is content in the second interface. Further, the second content is content that is in the second interface and that is most recently operated.

This solution provides a specific implementation in which the second terminal device transmits content to the first terminal device. In this solution, the second terminal device determines, based on content transmission indication information, to start a content transmission process, without depending on an NFC function of a mobile phone, or setting an NFC tag on a PC, which achieves excellent applicability. In addition, the content transmission method in embodiments of this disclosure does not depend on a third-party application, social software, or a data cable. In this case, content transmission is highly efficient and easy to implement. In addition, in this solution, the terminal device determines to-be-transmitted content and a content transmission direction. This improves content transmission efficiency, reduces user intervention, and improves user experience.

In a possible implementation, the first information includes status information of a first interface presented by the first terminal device, and the status information of the first interface includes at least one of a type of the first interface or a time at which the first interface is most recently operated.

For beneficial effects of this solution, refer to effects of corresponding implementations of the second aspect. Details are not described herein again.

In a possible implementation, the first information further includes content transmission indication information, and the content transmission indication information indicates that content transmission needs to be performed between the second terminal device and the first terminal device.

For beneficial effects of this solution, refer to effects of corresponding implementations of the second aspect. Details are not described herein again.

In a possible implementation, that the second terminal device determines, based on the first information, that a content transmission direction is that the second terminal device transmits content to the first terminal device includes that the second terminal device determines, based on the first information, that a type of the first interface is different from a type of a second interface presented by the second terminal device, a priority of the type of the first interface is the same as a priority of the type of the second interface, and a first time at which the first interface is most recently operated is earlier than a second time at which the second interface is most recently operated. The second terminal device determines that the content transmission direction is that the second terminal device transmits content to the first terminal device. Alternatively, the second terminal device determines, based on the first information, that a type of the first interface is different from a type of a second interface presented by the second terminal device, and a priority of the type of the first interface is lower than a priority of the type of the second interface. The second terminal device determines that the content transmission direction is that the second terminal device transmits content to the first terminal device. Alternatively, the second terminal device determines, based on the first information, that a type of the first interface is the same as a type of the second interface, and a first time at which the first interface is most recently operated is earlier than a second time at which the second interface is most recently operated. The second terminal device determines that the content transmission direction is that the second terminal device transmits content to the first terminal device.

This solution provides a specific implementation of determining, based on the first information, that the content transmission direction is that the second terminal device transmits content to the first terminal device.

In a possible implementation, before the second terminal device determines, based on the first information, that the content transmission direction is that the second terminal device transmits content to the first terminal device, the method further includes that the second terminal device determines that the second terminal device moves in a preset mode within preset duration before a receiving time of the first information.

For beneficial effects of this solution, refer to effects of corresponding implementations of the second aspect. Details are not described herein again.

According to a fifth aspect, an embodiment of this disclosure provides a terminal device, including a processor, a transceiver, and a memory. The processor executes program instructions in the memory. The processor is configured to obtain a first instruction, where the first instruction indicates that the terminal device needs to perform content transmission with another terminal device. The processor is further configured to respond to the first instruction. The transceiver is configured to send first information to a second terminal device, where the first information is used by the second terminal device to determine that a content transmission direction is that the terminal device transmits content to the second terminal device. The transceiver is further configured to receive content transmission direction indication information from the second terminal device. The processor is further configured to determine first content. The transceiver is further configured to send the first content to the second terminal device, so that the second terminal device displays the first content.

In a possible implementation, the terminal device further includes a display. The first information includes status information of a first interface presented by the display of the terminal device, and the status information of the first interface includes at least one of a type of the first interface or a time at which the first interface is most recently operated.

In a possible implementation, the first information further includes content transmission indication information, and the content transmission indication information indicates that content transmission needs to be performed between the second terminal device and the terminal device.

In a possible implementation, the processor is configured to trigger the first instruction based on an operation of controlling, by a user, the second terminal device to perform an operation on the terminal device, or trigger the first instruction based on an operation performed by a user on the terminal device, or receive the first instruction entered by a user into the terminal device.

In a possible implementation, the processor is configured to obtain an operation of controlling, by the user, the second terminal device to touch a first location of the terminal device, and trigger the first instruction if a capacitance value change characteristic of the first location that is caused by the operation matches a preset capacitance value change characteristic.

In a possible implementation, the terminal device further includes a display. The first content is a first interface presented by the display of the terminal device, or the first content is content in the first interface.

In a possible implementation, the first content is content that is in the first interface and that is most recently operated.

According to a sixth aspect, an embodiment of this disclosure provides a terminal device, including a processor, a display, a transceiver, and a memory. The processor executes program instructions in the memory. The transceiver is configured to receive first information from a first terminal device. The processor is configured to determine, based on the first information, that a content transmission direction is that the first terminal device transmits content to the terminal device. The transceiver is further configured to send content transmission direction indication information to the first terminal device, where the content transmission direction indication information indicates the first terminal device to transmit content to the terminal device. The transceiver is further configured to receive first content from the first terminal device. The display is configured to display the first content.

In a possible implementation, the first information includes status information of a first interface presented by the display of the first terminal device, and the status information of the first interface includes at least one of a type of the first interface or a time at which the first interface is most recently operated.

In a possible implementation, the first information further includes content transmission indication information, and the content transmission indication information indicates that content transmission needs to be performed between the terminal device and the first terminal device.

In a possible implementation, the processor is configured to determine, based on the first information, that a type of the first interface is different from a type of a second interface presented by the display of the terminal device, a priority of the type of the first interface is the same as a priority of the type of the second interface, and a first time at which the first interface is most recently operated is later than a second time at which the second interface is most recently operated, and determine that the content transmission direction is that the first terminal device transmits content to the terminal device, or determine, based on the first information, that a type of the first interface is different from a type of the second interface, and a priority of the type of the first interface is higher than a priority of the type of the second interface, and determine that the content transmission direction is that the first terminal device transmits content to the terminal device, or determine, based on the first information, that a type of the first interface is the same as a type of the second interface, and a first time at which the first interface is most recently operated is later than a second time at which the second interface is most recently operated, and determine that the content transmission direction is that the first terminal device transmits content to the terminal device.

In a possible implementation, before the processor is configured to determine, based on the first information, that the content transmission direction is that the first terminal device transmits content to the terminal device, the processor is further configured to determine that the terminal device moves in a preset mode within preset duration before a receiving time of the first information.

In a possible implementation, the terminal device further includes a display. The first content is a first interface presented by the display of the first terminal device, or the first content is content in the first interface.

In a possible implementation, the first content is content that is in the first interface and that is most recently operated.

According to a seventh aspect, an embodiment of this disclosure provides a terminal device, including a processor, a display, a transceiver, and a memory. The processor executes program instructions in the memory. The processor is configured to obtain a first instruction, where the first instruction indicates that the terminal device needs to perform content transmission with another terminal device. The processor is further configured to respond to the first instruction. The transceiver is configured to send first information to a second terminal device, where the first information is used by the second terminal device to determine that a content transmission direction is that the second terminal device transmits content to the terminal device. The transceiver is further configured to receive second content from the second terminal device. The display is configured to display the second content.

In a possible implementation, the first information includes status information of a first interface presented by the display of the terminal device, and the status information of the first interface includes at least one of a type of the first interface or a time at which the first interface is most recently operated.

In a possible implementation, the first information further includes content transmission indication information, and the content transmission indication information indicates that content transmission needs to be performed between the second terminal device and the terminal device.

In a possible implementation, the processor is configured to trigger the first instruction based on an operation of controlling, by a user, the second terminal device to perform an operation on the terminal device, or trigger the first instruction based on an operation performed by a user on the terminal device, or receive the first instruction entered by a user into the terminal device.

In a possible implementation, the processor is configured to obtain an operation of controlling, by the user, the second terminal device to touch a first location of the terminal device, and trigger the first instruction if a capacitance value change characteristic of the first location that is caused by the operation matches a preset capacitance value change characteristic.

In a possible implementation, the second content is a second interface presented by the display of the second terminal device, or the second content is content in the second interface.

In a possible implementation, the second content is content that is in the second interface and that is most recently operated.

According to an eighth aspect, an embodiment of this disclosure provides a terminal device, including a processor, a transceiver, and a memory. The processor executes program instructions in the memory. The transceiver is configured to receive first information from a first terminal device. The processor is configured to determine, based on the first information, that a content transmission direction is that the terminal device transmits content to the first terminal device. The processor is further configured to determine second content. The transceiver is further configured to send the second content to the first terminal device, so that the first terminal device displays the second content.

In a possible implementation, the first information includes status information of a first interface presented by the display of the first terminal device, and the status information of the first interface includes at least one of a type of the first interface or a time at which the first interface is most recently operated.

In a possible implementation, the first information further includes content transmission indication information, and the content transmission indication information indicates that content transmission needs to be performed between the terminal device and the first terminal device.

In a possible implementation, the processor is configured to determine, based on the first information, that a type of the first interface is different from a type of a second interface presented by the terminal device, a priority of the type of the first interface is the same as a priority of the type of the second interface, and a first time at which the first interface is most recently operated is earlier than a second time at which the second interface is most recently operated, and determine that the content transmission direction is that the terminal device transmits content to the first terminal device, or determine, based on the first information, that a type of the first interface is different from a type of the second interface, and a priority of the type of the first interface is lower than a priority of the type of the second interface, and determine that the content transmission direction is that the terminal device transmits content to the first terminal device, or determine, based on the first information, that a type of the first interface is the same as a type of the second interface, and a first time at which the first interface is most recently operated is earlier than a second time at which the second interface is most recently operated, and determine that the content transmission direction is that the terminal device transmits content to the first terminal device.

In a possible implementation, before the processor is configured to determine, based on the first information, that the content transmission direction is that the terminal device transmits content to the first terminal device, the processor is further configured to determine that the terminal device moves in a preset mode within preset duration before a receiving time of the first information.

In a possible implementation, the second content is a second interface presented by the display of the terminal device, or the second content is content in the second interface.

In a possible implementation, the second content is content that is in the second interface and that is most recently operated.

According to a ninth aspect, an embodiment of this disclosure provides a computer-readable nonvolatile storage medium. The storage medium is configured to store a computer program, and when the computer program is executed by a computer or a processor, the method in any one of the first aspect or the implementations of the first aspect or the method in any one of the third aspect or the implementations of the third aspect is implemented.

According to a tenth aspect, an embodiment of this disclosure provides a computer-readable nonvolatile storage medium. The storage medium is configured to store a computer program, and when the computer program is executed by a computer or a processor, the method in any one of the second aspect or the implementations of the second aspect or the method in any one of the fourth aspect or the implementations of the fourth aspect is implemented.

According to an eleventh aspect, an embodiment of this disclosure provides a chip, including a processor, a memory, and a communications interface. The processor and the memory are connected to the communications interface, and the processor is configured to read and execute a computer program stored in the memory, to perform the method in any one of the first aspect or the implementations of the first aspect or the method in any one of the third aspect or the implementations of the third aspect.

According to a twelfth aspect, an embodiment of this disclosure provides a chip, including a processor, a memory, and a communications interface. The processor and the memory are connected to the communications interface, and the processor is configured to read and execute a computer program stored in the memory, to perform the method in any one of the second aspect or the implementations of the second aspect or the method in any one of the fourth aspect or the implementations of the fourth aspect.

In this disclosure, the terminal device triggers a content transmission process by obtaining an instruction, without depending on an NFC function of a mobile phone, or setting an NFC tag on a PC, which achieves excellent applicability. In addition, the content transmission method in this disclosure does not depend on a third-party application, social software, or a data cable. In this case, content transmission is highly efficient and easy to implement. In addition, in this solution, the terminal device determines to-be-transmitted content and a content transmission direction. This improves content transmission efficiency, reduces user intervention, and improves user experience.

DESCRIPTION OF EMBODIMENTS

For ease of understanding of this disclosure, a system architecture and a device to which this disclosure is applied are first described with reference to FIG. 1 to FIG. 3.

Figure 1:
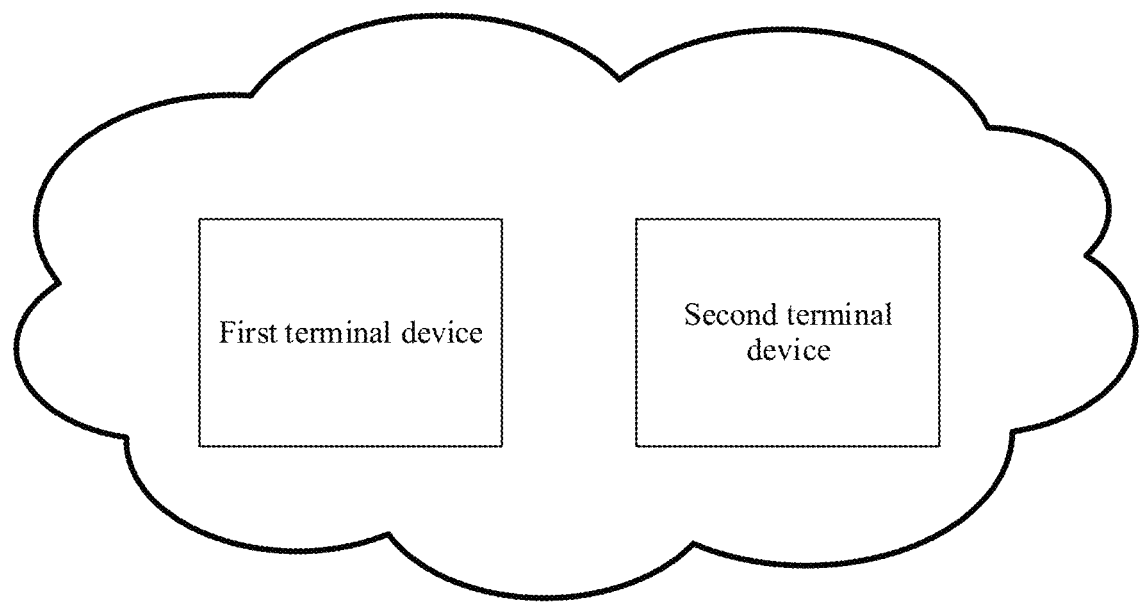
FIG. 1 is a diagram of a system architecture according to an embodiment of this disclosure.

FIG. 1 is a diagram of a system architecture according to an embodiment of this disclosure. As shown in FIG. 1, the system architecture includes a first terminal device and a second terminal device. The first terminal device may be a PC or a mobile phone. The PC includes but is not limited to a desktop computer, a notebook computer, and a tablet computer. The second terminal device may be a PC or a mobile phone.

The first terminal device and the second terminal device are close and generally located in a same scenario. For example, the first terminal device and the second terminal device are located in a same home, a same office, or a same activity venue. The first terminal device and the second terminal device may communicate. For example, the first terminal device and the second terminal device may communicate over a network (for example, WI-FI) or BT.

Figure 2:
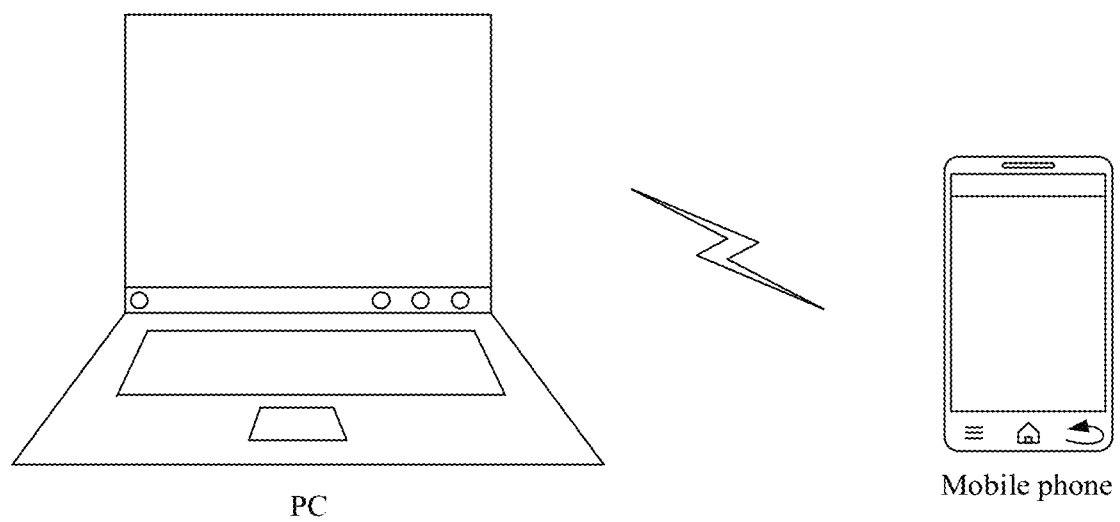
FIG. 2 is a diagram of a specific system architecture included in the system architecture shown in FIG. 1.

FIG. 2 is a diagram of a specific system architecture included in the system architecture shown in FIG. 1. As shown in FIG. 2, the system architecture includes a PC and a mobile phone.

In this disclosure, the first terminal device and the second terminal device each are an electronic device. The following describes a structure of an electronic device with reference to FIG. 3.

Figure 3:
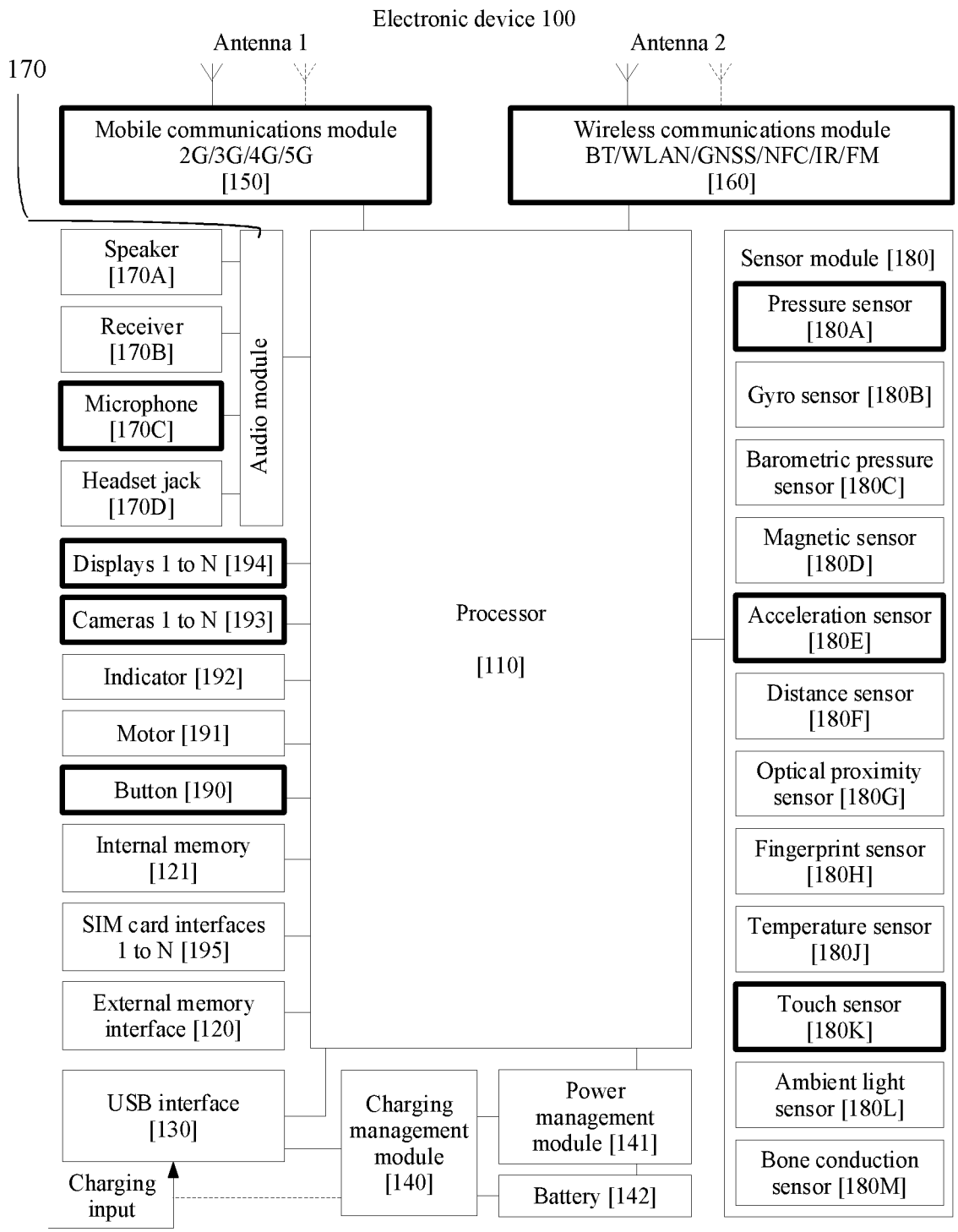
FIG. 3 is a schematic diagram of a structure of an electronic device according to an embodiment of this disclosure.

FIG. 3 is a schematic diagram of a structure of an electronic device according to an embodiment of this disclosure. As shown in FIG. 3, the electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this disclosure does not constitute a specific limitation on the electronic device 100. In some other embodiments of this disclosure, the electronic device 100 may include more or fewer components than those shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a Mobile Industry Processor Interface (MIPI), a general-purpose input/output (GPIO) interface, a SIM interface, a USB interface, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a BLUETOOTH headset.

The PCM interface may also be configured to perform audio communication, and sample, quantize, and encode an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a BLUETOOTH headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music through the BLUETOOTH headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

It may be understood that an interface connection relationship between the modules shown in embodiments of this disclosure is merely an example for description, and does not constitute a limitation on the structure of the electronic device 100. In some other embodiments of this disclosure, the electronic device 100 may alternatively use an interface connection manner different from that in the foregoing embodiment, or use a combination of a plurality of interface connection manners.

The mobile communications module 150 may provide a solution, applied to the electronic device 100, to wireless communication including second generation (2G)/third generation (3G)/fourth generation (4G)/fifth generation (5G) and the like. The mobile communication module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low frequency baseband signal is transmitted to the application processor. The application processor outputs a sound signal through an audio device (which is not limited to the speaker 170A, the receiver 170B, and the like), or displays an image or a video on the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (WLAN) (for example, a WI-FI network), BT, a global navigation satellite system (GNSS), frequency modulation (FM), NFC, an infrared (IR) technology, and the like. The wireless communications module 160 may be one or more devices integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

Optionally, the touch sensor may be disposed on the display, and the touch sensor and the display 194 form a touchscreen, which is also referred to as a "touchscreen". The touch sensor is configured to detect a touch operation performed on or near the touch sensor. The touch sensor may transfer the detected touch operation to the application processor, to determine a type of a touch event. A visual output related to the touch operation may be provided through the display 194. The touch sensor may alternatively be disposed on a surface of the electronic device 100 at a location different from that of the display 194. The touch sensor may also be referred to as a touch panel or a touch-sensitive surface.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of encoding formats, for example, Moving Picture Experts Group (MPEG)-1, MPEG-2, MPEG-3, and MPEG-4.

The NPU is a neural-network (NN) computing processor that processes input information rapidly by referring to a structure of a biological neural network, for example, by referring to a transmission mode between human brain neurons, and can further perform self-learning continuously. Applications such as intelligent cognition of the electronic device 100, for example, image recognition, facial recognition, speech recognition, and text understanding, may be implemented through the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the electronic device 100. In addition, the internal memory 121 may include a high-speed random-access memory (RAM), and may further include a nonvolatile memory, for example, at least one magnetic disk storage device, a flash memory, or a Universal Flash Storage (UFS). The processor 110 runs the instructions stored in the internal memory 121 and/or the instructions stored in the memory disposed in the processor, to implement various function applications and data processing of the electronic device 100.

The electronic device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The following describes the technical solutions of this disclosure in detail with reference to specific embodiments. It should be noted that the following embodiments may exist independently or may be combined with each other, and same or similar content is not repeatedly described in different embodiments.

Figure 4A:
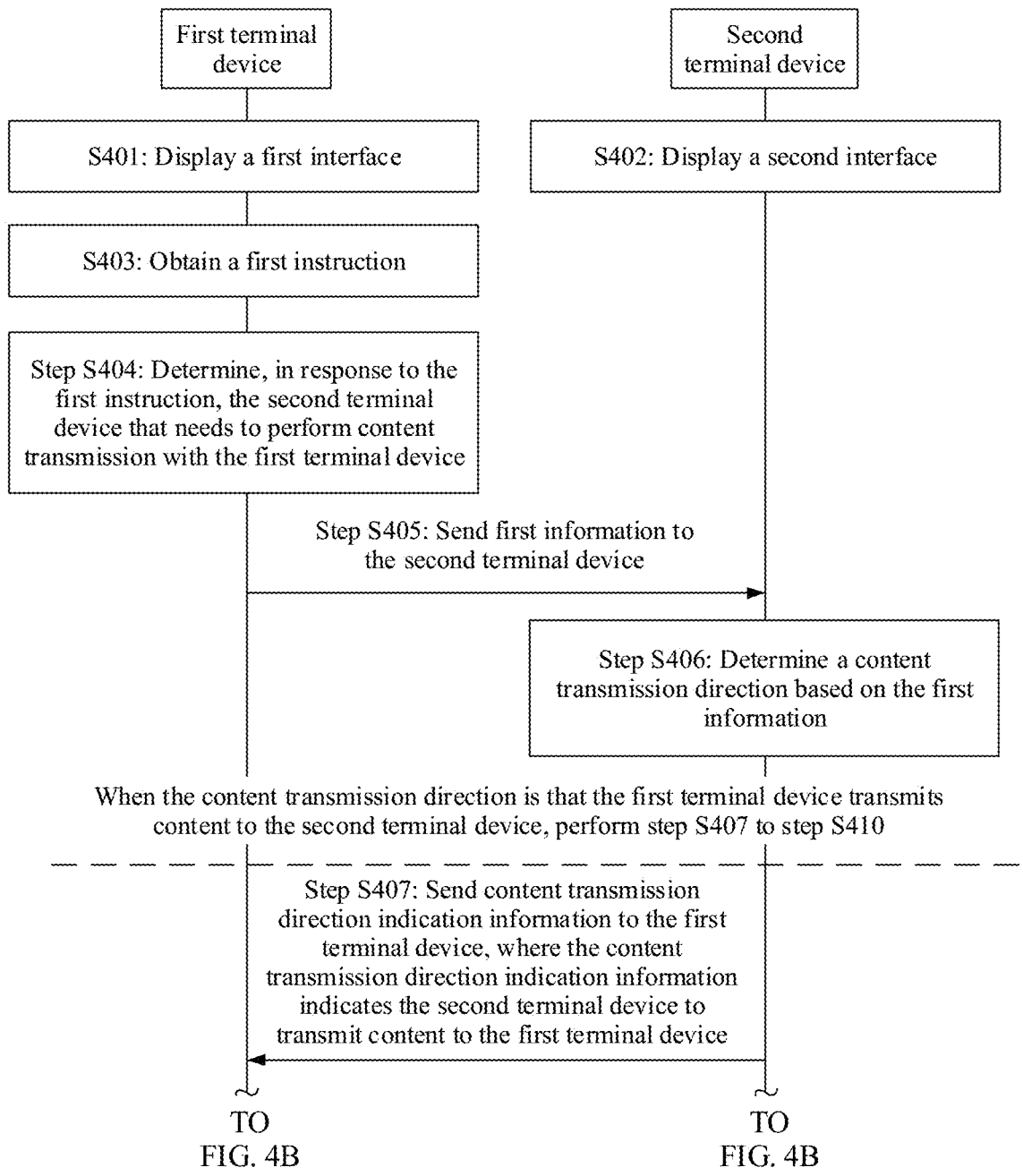
FIG. 4A and FIG. 4B are an interaction diagram of a content transmission method according to an embodiment of this disclosure.
Figure 4B:
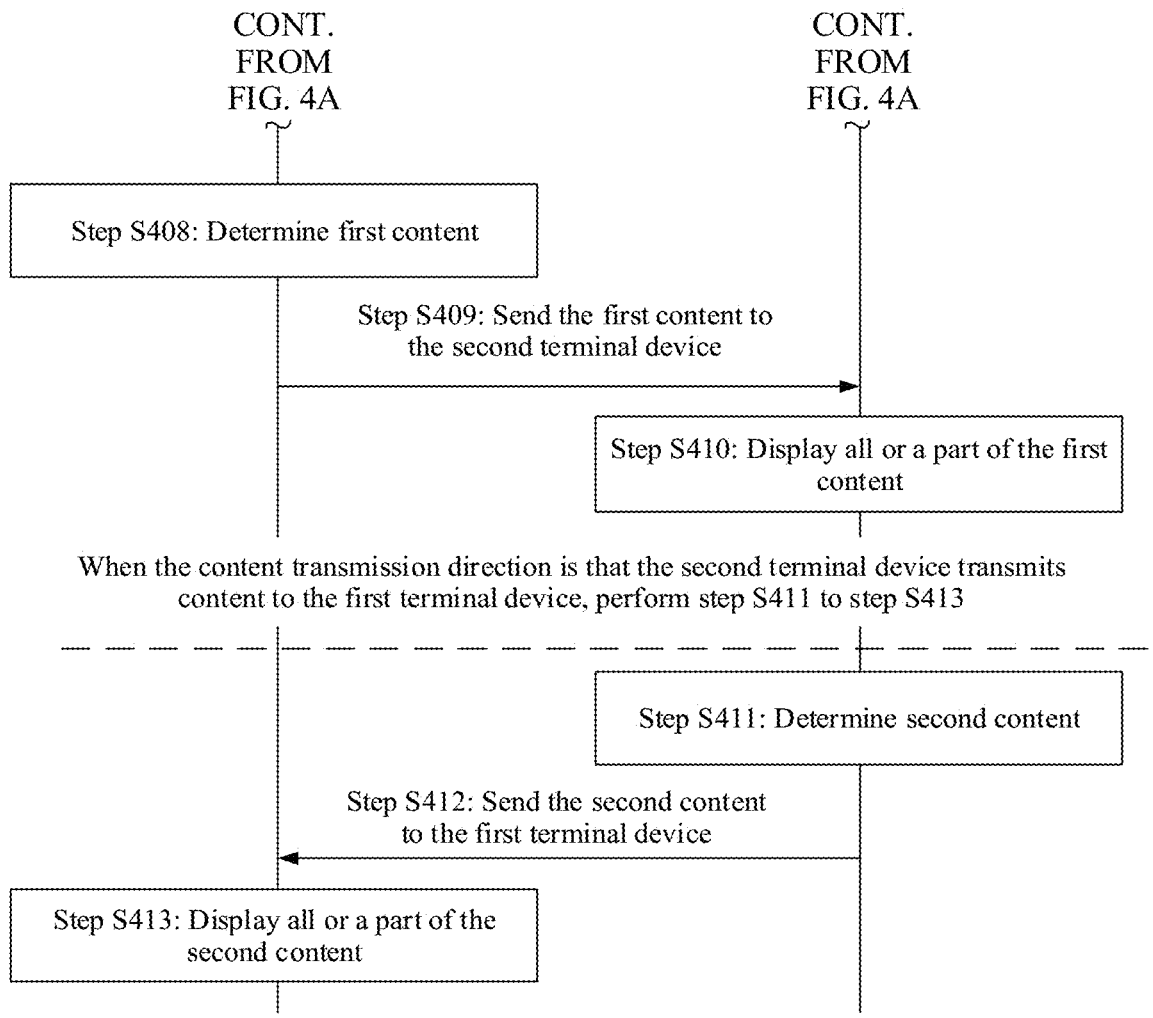

FIG. 4A and FIG. 4B are an interaction diagram of a content transmission method according to an embodiment of this disclosure. As shown in FIG. 4A and FIG. 4B, the method may include the following steps.

Step S401: A first terminal device presents a first interface.

The first terminal device may be a PC or a mobile phone. The first terminal may present the first interface by using the display 194 shown in FIG. 3.

Details about the first interface are as follows.

(1) The first interface may include one or more windows, and another window may be nested in one window.

Figure 5:
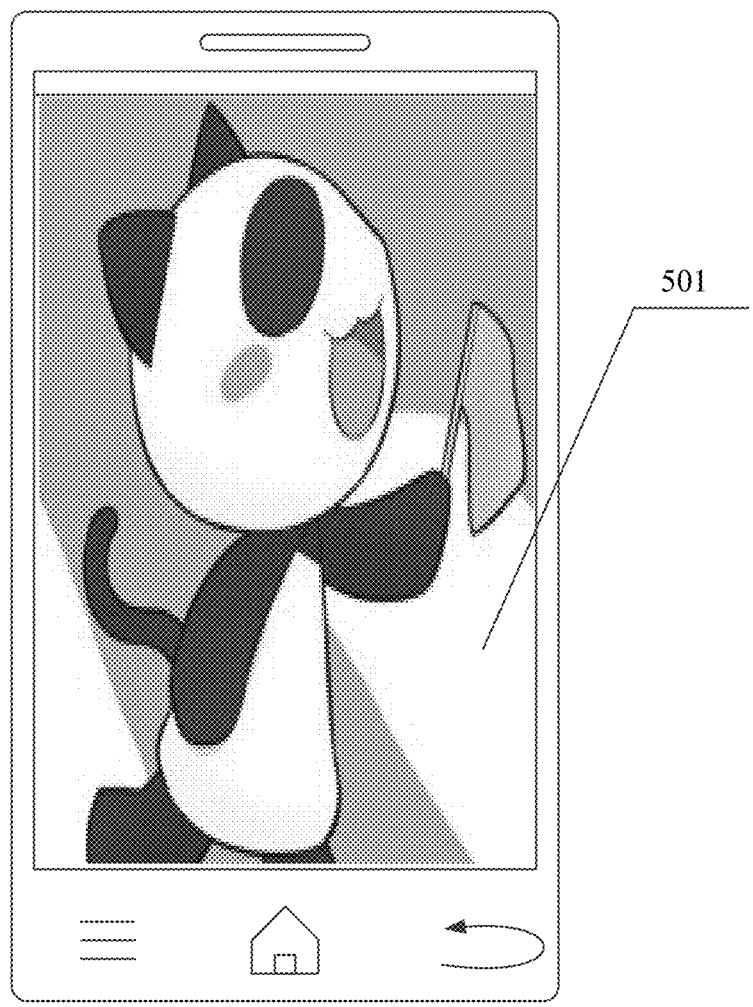
FIG. 5 is a schematic diagram 1 of a first interface according to an embodiment of this disclosure.
Figure 6:
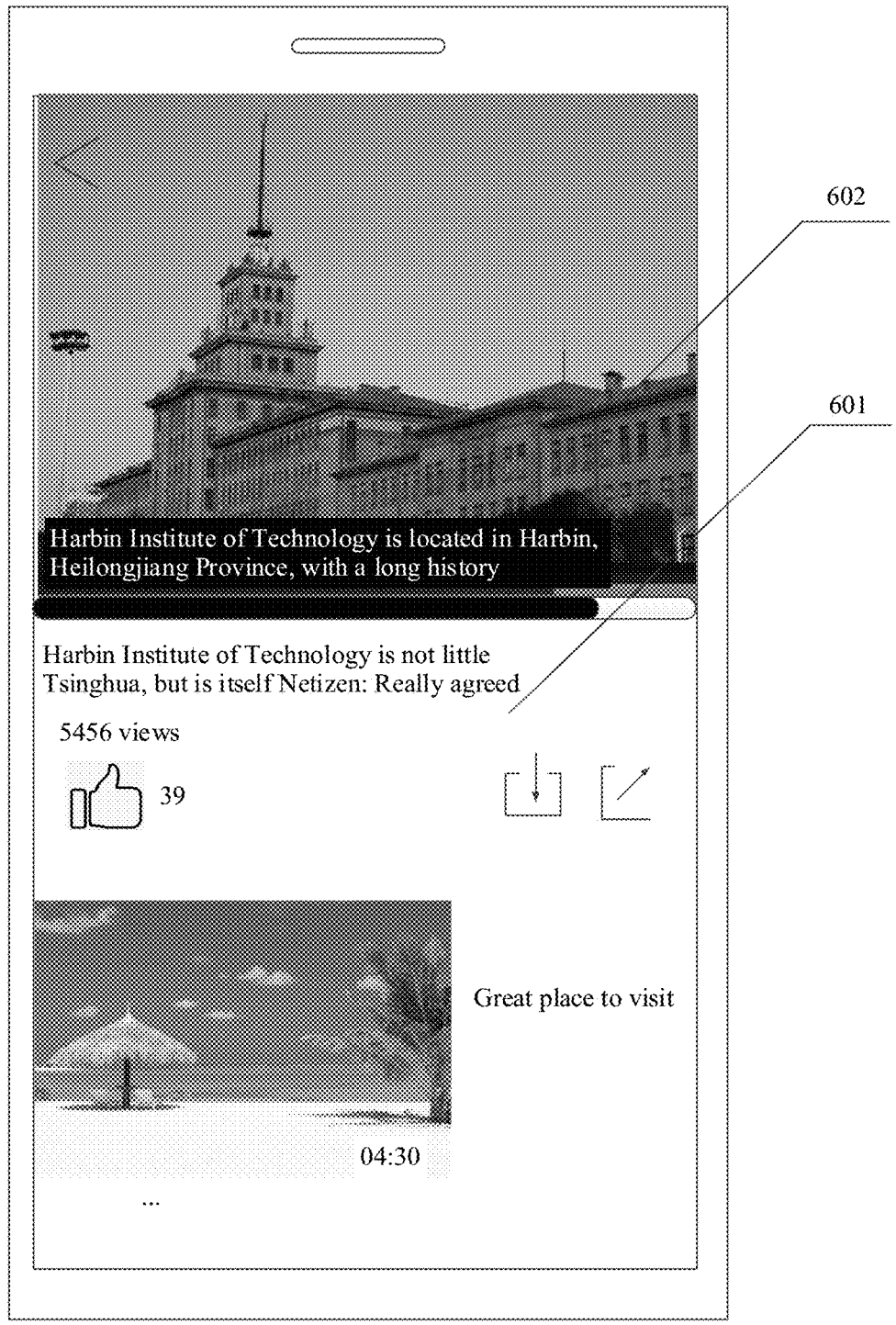
FIG. 6 is a schematic diagram 2 of a first interface according to an embodiment of this disclosure.

FIG. 5 is a schematic diagram 1 of a first interface according to an embodiment of this disclosure, and FIG. 6 is a schematic diagram 2 of a first interface according to an embodiment of this disclosure.

For example, as shown in FIG. 5 and FIG. 6, the window of the first interface includes a picture or video display window.

As shown in FIG. 5, the first interface includes a picture display window 501, and no other window is nested in the picture display window 501. As shown in FIG. 6, the first interface includes a video window 601, and a video play window 602 is nested in the video window 601.

For example, the first interface includes a folder display window, the folder display window includes icons of zero or one or more objects, and the object may be a document or a picture.

For example, the first interface includes a video display window and a web page display window.

For example, the first interface includes a gallery display window, and the gallery display window displays icons of one or more pictures.

(2) The first interface may include no window. For example, the first interface is a desktop of the first terminal device.

Step S402: A second terminal device presents a second interface.

The second terminal device may be a mobile phone or a PC. The second terminal may present the second interface by using the display 194 shown in FIG. 3. In a manner, if the first terminal device is a PC, the second terminal device may be a mobile phone. If the first terminal device is a mobile phone, the second terminal device may be a PC.

Details about the second interface are as follows.

(1) The second interface may include one or more windows, and another window may be nested in one window.

(2) The second interface may include no window. For example, the second interface is a desktop of the second terminal device.

Step S403: The first terminal device obtains a first instruction.

The first instruction indicates that the first terminal device needs to perform content transmission with another terminal device. The other terminal device is a device that has established a persistent connection and a credit with the first terminal device. For example, a device that establishes a BT connection with the first terminal device is a device that has established a persistent connection and a credit with the first terminal device.

Optionally, the first terminal device may obtain the first instruction in but not limited to the following feasible implementations.

In a feasible implementation, that the first terminal device obtains a first instruction includes that the first terminal device receives the first instruction entered by a user into the first terminal device.

Corresponding to a solution of this feasible implementation, the button 190 of the first terminal device includes a content transmission button (a physical button). The user may perform a press operation on the content transmission button to enter the first instruction. The first terminal device receives the first instruction. In this solution, a user operation is simple and convenient, and user experience is improved.

Corresponding to another solution of this feasible implementation, the button 190 of the first terminal device includes a plurality of physical buttons, at least two preset physical buttons are disposed in the plurality of physical buttons, and the user may perform a press operation on each of the at least two preset physical buttons to enter the first instruction. The first terminal receives the first instruction. The plurality of physical buttons may be, for example, a plurality of physical buttons on a keyboard of the PC. In this solution, a user operation is simple and convenient, and user experience is improved.

Corresponding to another solution of this feasible implementation, an image collection apparatus (for example, the camera 193) is disposed in the first terminal device, and the image collection apparatus may collect an image. A preset image may be preset in the first terminal device. The first terminal device may perform recognition processing on the image collected by the image collection apparatus. The first terminal device triggers the first instruction when determining that the image collected by the image collection apparatus matches the preset image. For example, the preset image may be an image that includes a preset gesture (for example, an "S"-shaped gesture or an "OK" gesture) or an image that includes a preset emoticon (for example, an emoticon indicating pleasure or sadness). Optionally, to reduce a quantity of misoperations, the first terminal device triggers the first instruction when all of a plurality of images continuously collected by the image collection apparatus match the preset image. That is, the user may enter the first instruction by displaying the preset gesture, the preset emoticon, or the like in front of the image collection apparatus. In this solution, a user operation is simple, convenient, and flexible, and user experience is improved.

Corresponding to another solution of this feasible implementation, the microphone 170C in the audio module 170 of the first terminal device may collect and identify speech information of the user, a keyword set may be preset in the first terminal device, and the first terminal device may recognize speech collected by the microphone. The first terminal device triggers the first instruction if a keyword in the keyword set is identified. For example, the keyword set includes keywords such as file transmission, picture transmission, content transmission, and interconnection. The first terminal device triggers the first instruction when the user gives speech such as "file transmission", "picture transmission", "content transmission", and/or "interconnection". That is, the user may enter the first instruction by entering speech information used to indicate the first terminal device to perform content transmission with another terminal device. In this solution, a user operation is simple, convenient, and flexible, and user experience is improved.

Certainly, the user may alternatively enter the first instruction into the first terminal device by using another feasible implementation solution. This is not limited in embodiments of this disclosure.

In another feasible implementation, that the first terminal device obtains a first instruction includes that the first terminal device triggers the first instruction based on an operation performed by a user on the first terminal device. Further, the first terminal device obtains the operation performed by the user on the first terminal device, and triggers the first instruction if an acceleration characteristic of the first terminal device that is caused by the operation is the same as a preset acceleration characteristic. The preset acceleration characteristic may be preset in the first terminal device, and one preset acceleration characteristic corresponds to one operation performed by the user on the first terminal device. The first terminal device obtains, by using the acceleration sensor 180E, acceleration obtained after the user performs an operation on the first terminal device, and the first terminal device triggers the first instruction after determining that the acceleration characteristic of the first terminal device matches the preset acceleration characteristic. For example, the preset acceleration characteristic may be an acceleration characteristic that is of the first terminal device and that corresponds to an operation of continuously tapping a preset location of the first terminal device several times. In this solution, a user operation is simple, convenient, and flexible, and user experience is improved.

In still another feasible implementation, that the first terminal device obtains a first instruction includes that the first terminal device triggers the first instruction based on an operation of controlling, by a user, the second terminal device to perform an operation on the first terminal device. Further, the first terminal device obtains an operation of controlling, by the user, the second terminal device to touch a first location of the first terminal device. The first terminal device triggers the first instruction if a capacitance value change characteristic of the first location that is caused by the operation matches a preset capacitance value change characteristic. Correspondingly, the first terminal device in this implementation may be a PC, and the second terminal device in this implementation may be a mobile phone. In this implementation, the first terminal device may alternatively be a mobile phone, and the second terminal device may alternatively be a mobile phone.

Corresponding to a solution of this feasible implementation, a touchpad is disposed on the first terminal device, and the touchpad includes the pressure sensor 180A. In this case, the first location is a location of the touchpad. That is, the first terminal device obtains an operation of controlling, by the user, the second terminal device to touch the touchpad of the first terminal device, and the first terminal device triggers the first instruction if a capacitance value change characteristic of the touchpad that is caused by the operation matches the preset capacitance value change characteristic. The touchpad has at least the following function. The user may tap a preset area of the touchpad, to move a cursor without using a mouse. The preset capacitance value change characteristic may be preset in the first terminal device. After the user controls the second terminal device to touch the touchpad of the first terminal device, the first terminal device obtains the capacitance value change characteristic of the touchpad, and triggers the first instruction after determining that the capacitance value change characteristic of the touchpad matches the preset capacitance value change characteristic.

For example, the preset capacitance value change characteristic preset in the first terminal device is a capacitance value change characteristic obtained after the mobile phone touches the touchpad of the first terminal. In this case, the preset capacitance value change characteristic may be that a shape of an area in which a capacitance value change occurs on the touchpad is a long strip shape. A capacitance value change in an upper edge of the area and that in a lower edge of the area are slighter than a capacitance value change in the middle of the area.

When the second terminal device is a mobile phone, after the user controls the second terminal device to touch the touchpad of the first terminal device, the capacitance value change characteristic of the touchpad that is obtained by the first terminal device is that a shape of an area in which a capacitance value change occurs on the touchpad is a long strip shape. A capacitance value change in an upper edge of the area and that in a lower edge of the area are slighter than a capacitance value change in the middle of the area. The first terminal device determines that the capacitance value change characteristic of the touchpad matches the preset capacitance value change characteristic, and the first terminal device triggers the first instruction.

Figure 7B:
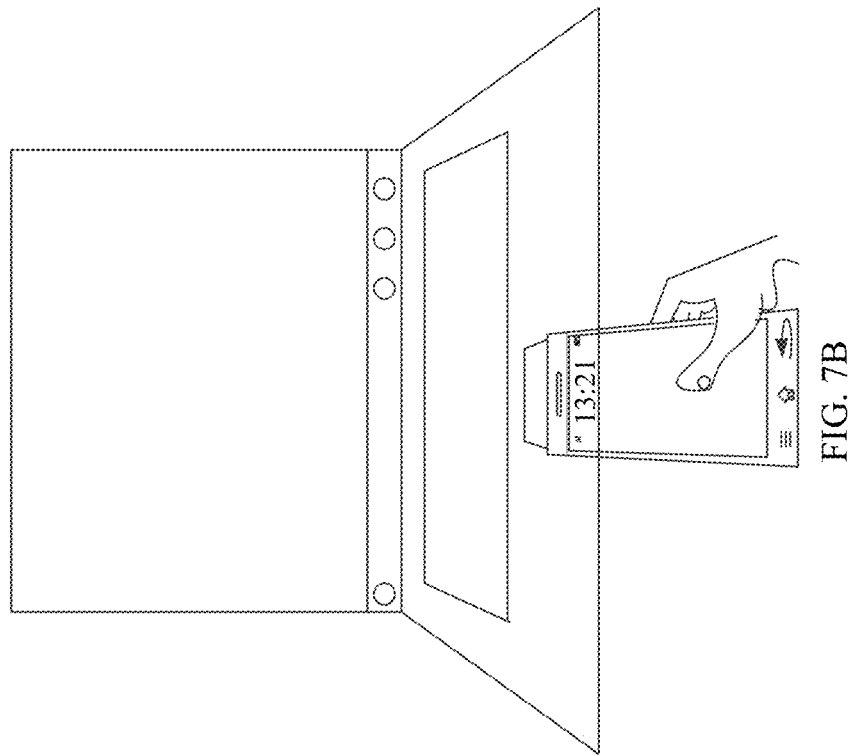
FIG. 7A and FIG. 7B are a schematic diagram 1 of obtaining a first instruction by a first terminal device according to an embodiment of this disclosure.
Figure 7A:
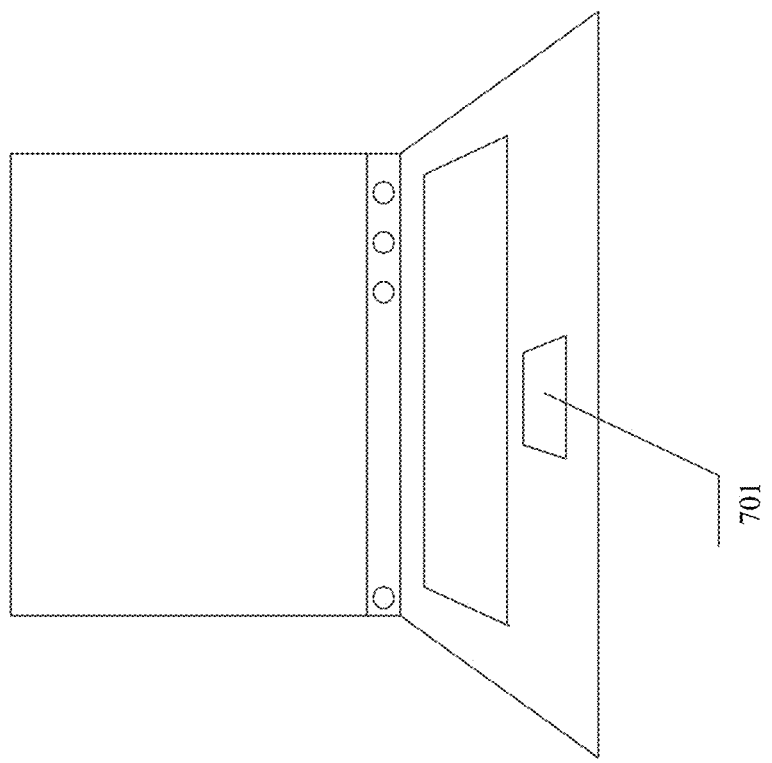

FIG. 7A and FIG. 7B are a schematic diagram 1 of obtaining a first instruction by a first terminal device according to an embodiment of this disclosure. With reference to FIG. 7A and FIG. 7B, this solution is described by using an example. As shown in FIG. 7A and FIG. 7B, a touchpad 701 is disposed on a PC. As shown in FIG. 7B, a user controls a mobile phone to touch the touchpad 701 of the PC, and the PC obtains a capacitance value change characteristic of the touchpad, and triggers the first instruction after determining that the capacitance value change characteristic of the touchpad matches a preset capacitance value change characteristic.

Corresponding to another solution of this feasible implementation, a display of the first terminal device may be a touchscreen, and the touchscreen corresponds to the touch sensor 180K. The preset capacitance value change characteristic may be preset in the first terminal device. After the user controls the second terminal device to touch the touchscreen of the first terminal device, the first terminal device obtains a capacitance value change characteristic of the touchscreen, and triggers the first instruction after determining that the capacitance value change characteristic of the touchscreen matches the preset capacitance value change characteristic. Correspondingly, the corresponding first location in this solution is the touchscreen of the first terminal device.

For example, the preset capacitance value change characteristic preset in the first terminal device is a capacitance value change characteristic obtained after the mobile phone touches the touchscreen of the first terminal. In this case, the preset capacitance value change characteristic may be that a shape of an area in which a capacitance value change occurs on the touchscreen is a long strip shape. A capacitance value change in an upper edge of the area and that in a lower edge of the area are slighter than a capacitance value change in the middle of the area.

When the second terminal device is a mobile phone, after the user controls the second terminal device to touch the touchscreen of the first terminal device, the capacitance value change characteristic of the touchscreen that is obtained by the first terminal device is that a shape of an area in which a capacitance value change occurs on the touchscreen is a long strip shape. A capacitance value change in an upper edge of the area and that in a lower edge of the area are slighter than a capacitance value change in the middle of the area. The first terminal device determines that the capacitance value change characteristic of the touchscreen matches the preset capacitance value change characteristic, and the first terminal device triggers the first instruction.

In a specific implementation, that the first terminal device obtains a capacitance value change characteristic of the touchscreen, and triggers the first instruction after determining that the capacitance value change characteristic of the touchscreen matches the preset capacitance value change characteristic includes that a touchscreen chip of the first terminal device obtains the capacitance value change characteristic of the touchscreen, and the touchscreen chip triggers the first instruction after determining that the capacitance value change characteristic of the touchscreen matches the preset capacitance value change characteristic.

Figure 8A:
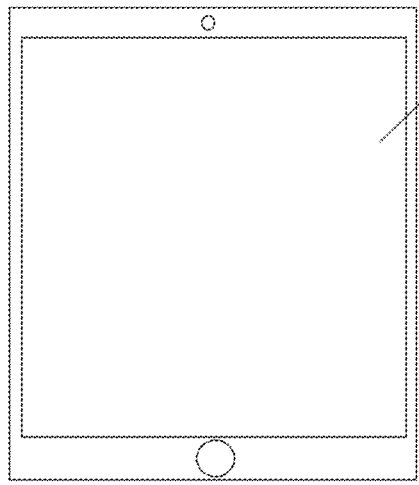
FIG. 8A and FIG. 8B are a schematic diagram 2 of obtaining a first instruction by a first terminal device according to an embodiment of this disclosure.
Figure 8B:
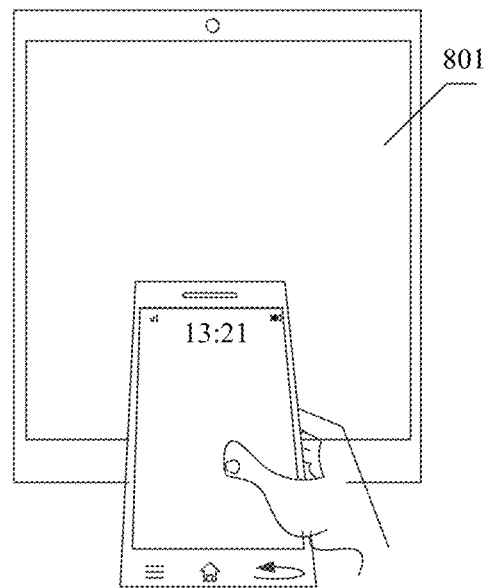

FIG. 8A and FIG. 8B are a schematic diagram 2 of obtaining a first instruction by a first terminal device according to an embodiment of this disclosure. With reference to FIG. 8A and FIG. 8B, this solution is described by using an example. As shown in FIG. 8A and FIG. 8B, a touchscreen 801 is disposed on a PC. As shown in FIG. 8B, a user controls a mobile phone to touch the touchscreen 801 of the PC, and the PC obtains a capacitance value change characteristic of the touchscreen 801, and triggers the first instruction after determining that the capacitance value change characteristic of the touchscreen 801 matches a preset capacitance value change characteristic.

Step S404: The first terminal device determines, in response to the first instruction, the second terminal device that needs to perform content transmission with the first terminal device.

After obtaining the first instruction, the first terminal device determines, in response to the first instruction, the second terminal device that performs content transmission with the first terminal device. In a solution, the first terminal device determines that a terminal device that establishes a persistent connection and a credit with the first terminal device is a device that performs content transmission with the first terminal device. For example, a BT connection is established between the second terminal device and the first terminal device, and the first terminal device determines that the second terminal device is a terminal device that needs to perform content transmission with the first terminal device.

Step S405: The first terminal device sends first information to the second terminal device.

The first information indicates that the second terminal device needs to perform content transmission with the first terminal device.

Details about the first information are as follows. In a solution, the first information includes content transmission indication information and status information of the first interface. The content transmission indication information indicates that content transmission needs to be performed between the second terminal device and the first terminal device. The status information of the first interface may include but not limited to at least one of the following.

(1) Type of the first interface: The type of the first interface may be a desktop interface, a window interface, or a gallery interface (that is, if a display interface of the first interface is a gallery display interface, although the gallery display interface is also a window, it is considered that the type of the first interface is the gallery interface in embodiments), a priority of the gallery interface and that of the window interface are higher than that of the desktop interface, and the priority of the gallery interface is the same as that of the window interface. In a manner, if the first terminal device is a PC, the type of the first interface may be a desktop interface or a window interface, that is, the type of the first interface includes no gallery interface. If the first terminal device is a mobile phone, the type of the first interface may be a desktop interface, a window interface, or a gallery interface.

For example, if the first interface is a desktop of the first terminal device, the type of the first interface is a desktop interface.

For example, if the first interface is a full-screen video display interface, the type of the first interface is a window interface.

For example, if the first interface is a folder opening interface, the type of the first interface is a window interface.

For example, if the first interface is a gallery display interface, the type of the first interface is a gallery interface.

For example, if the first interface is a gallery display interface and the first terminal device is a mobile phone, the type of the first interface is a gallery interface.

For example, if the first interface is a gallery display interface and the first terminal device is a PC, the type of the first interface is a window interface.

(2) Time at which the first interface is most recently operated by the user. It may be understood that, if the operation most recently performed by the user on the first interface is an operation performed on a first window included in the first interface, the time at which the first interface is most recently operated by the user is a time at which the first window is most recently operated by the user.

In another solution, the first information includes status information of the first interface, and information included in the status information of the first interface is the same as that in the foregoing solution. In this solution, the status information of the first interface further implicitly indicates that the second terminal device needs to perform content transmission with the first terminal device.

Step S406: The second terminal device determines a content transmission direction based on the first information.

The content transmission direction is that the first terminal device transmits content to the second terminal device, or the content transmission direction is that the second terminal device transmits content to the first terminal device.

In a manner, a method for determining a content transmission direction may be implemented in a1 to a3.

a1. The second terminal device determines whether a type of the first interface is the same as a type of the second interface.

a2. If the type of the first interface is the same as the type of the second interface, the second terminal device compares a first time at which the first interface is most recently operated by the user with a second time at which the second interface is most recently operated by the user, and if the first time is later than the second time, the second terminal device determines that the content transmission direction is that the first terminal device transmits content to the second terminal device, or if the second time is later than the first time, the second terminal device determines that the content transmission direction is that the second terminal device transmits content to the first terminal device.

a3. If the type of the first interface is different from the type of the second interface, the second terminal device determines whether a priority of the type of the first interface is the same as a priority of the type of the second interface.

If the priority of the type of the first interface is the same as the priority of the type of the second interface, the second terminal device compares a first time at which the first interface is most recently operated by the user with a second time at which the second interface is most recently operated by the user, and if the first time is later than the second time, the second terminal device determines that the content transmission direction is that the first terminal device transmits content to the second terminal device, or if the second time is later than the first time, the second terminal device determines that the content transmission direction is that the second terminal device transmits content to the first terminal device.

If the priority of the type of the first interface is higher than the priority of the type of the second interface, the second terminal device determines that the content transmission direction is that the first terminal device transmits content to the second terminal device. If the priority of the type of the second interface is higher than the priority of the type of the first interface, the second terminal device determines that the content transmission direction is that the second terminal device transmits content to the first terminal device.

Optionally, if a manner in which the first terminal obtains the first instruction is that the first terminal device triggers the first instruction based on the operation of controlling, by the user, the second terminal device to perform an operation on the first terminal device in step S403, after the second terminal device receives the first information, the method further includes that the second terminal device determines whether the second terminal device moves in a preset mode within preset duration before a receiving time of the first information, and if yes, the second terminal device determines the content transmission direction based on the first information. The movement in the preset mode is movement generated when the user controls the second terminal device to touch the touchpad or the touchscreen of the first terminal device. To be specific, the movement in the preset mode includes that the second terminal device moves in a direction close to the first terminal device to touch the touchpad or the touchscreen of the first terminal device. Then, the second terminal moves in a direction away from the first terminal device to leave the touchpad or the touchscreen of the first terminal device. Specific movement in the preset mode includes that the second terminal device moves downward to touch the touchpad of the first terminal device. Then, the second terminal moves upward to leave the touchpad of the first terminal device.

An acceleration change characteristic corresponding to the movement in the preset mode may be preset in the first terminal device. The second terminal device may determine whether an acceleration change characteristic that matches the acceleration change characteristic corresponding to the movement in the preset mode exists in acceleration change characteristics of the second terminal device within the preset duration before the receiving time of the first information, and if yes, determines that the second terminal device moves in the preset mode within the preset duration before the receiving time of the first information.

Optionally, the preset duration may be any value from 30 s to 90 s.

When the content transmission direction is that the first terminal device transmits content to the second terminal device, step S407 to step S410 are performed.

Step S407: The second terminal device sends content transmission direction indication information to the first terminal device, where the content transmission direction indication information indicates the first terminal device to transmit content to the second terminal device.

Step S408: The first terminal device determines first content.

The first content is content that is in the first interface and that is most recently operated by the user.

A specific implementation is as follows.

(1) If the first interface includes no window, the first content sent to the second terminal device is the first interface.

(2) If the type of the first interface is a window interface, the first content sent to the second terminal device is content displayed in a window most recently operated by the user in the first interface. For example, the first interface includes one window, and a video play window is nested in the window. If an operation most recently performed by the user on the first interface is an operation performed on the video play window, (for example, the user opens the video play window or taps a pause icon in the video play window), the content displayed in the window most recently operated by the user in the first interface is a video played in the video play window. If an operation most recently performed by the user on the first interface is an operation performed on a part of the window other than the video play window, the content displayed in the window most recently operated by the user in the first interface is an interface of the window. It may be understood that, if the first interface includes one window, and no other window is nested in the window, a window most recently operated by the user in the first interface is the window included in the first interface.

(3) If the type of the first interface is a gallery interface and an operation most recently performed by the user on the first interface is opening the first interface, the first content sent to the second terminal device is the gallery interface, that is, the first interface. If the type of the first interface is a gallery interface and an operation most recently performed by the user on the first interface is selecting one or more pictures or one or more videos in the gallery, the first content sent to the second terminal device is the one or more pictures or the one or more videos selected by the user.

Step S409: The first terminal device sends the first content to the second terminal device.

In a manner, the first terminal device may send the first content to the second terminal device over BT or WI-FI.

Step S410: The second terminal device displays all or a part of the first content.

After receiving the first content, the second terminal device may display all or a part of the first content. A manner of displaying the first content on the first terminal device may be the same as or different from a manner of displaying the first content on the second terminal device. Optionally, a current display interface of the second terminal device may further display a transfer progress of the first content.

For example, if the first content is one picture, and a manner of displaying the picture on the first terminal device is displaying an icon of the picture or displaying the picture in a full-screen view state or in a non-full-screen view state, the second terminal device displays the picture in a full-screen view state or in a non-full-screen view state after receiving the picture.

For another example, the first content includes a plurality of pictures, and a manner of displaying the plurality of pictures on the first terminal device is displaying respective icons of the plurality of pictures on a gallery interface. Correspondingly, the second terminal device displays, in a view state, a picture that is first received in the plurality of pictures. In this case, the current display interface of the second terminal device is a display interface of the picture that is first received. The current display interface of the second terminal device may further display the icons of the plurality of pictures. When the user taps an icon of any one of the plurality of pictures, the second terminal device displays the picture. Optionally, a current display interface of the second terminal device may further display transfer progresses of the plurality of pictures.

In another manner, the second terminal device may not display the first content. In this case, the second terminal device may display first reminder information used to indicate that the first content is received. The first reminder information may include a type of the received first content, and may further include an amount of received first content. For example, the first reminder information is "10 pictures are received."

Figure 9A:
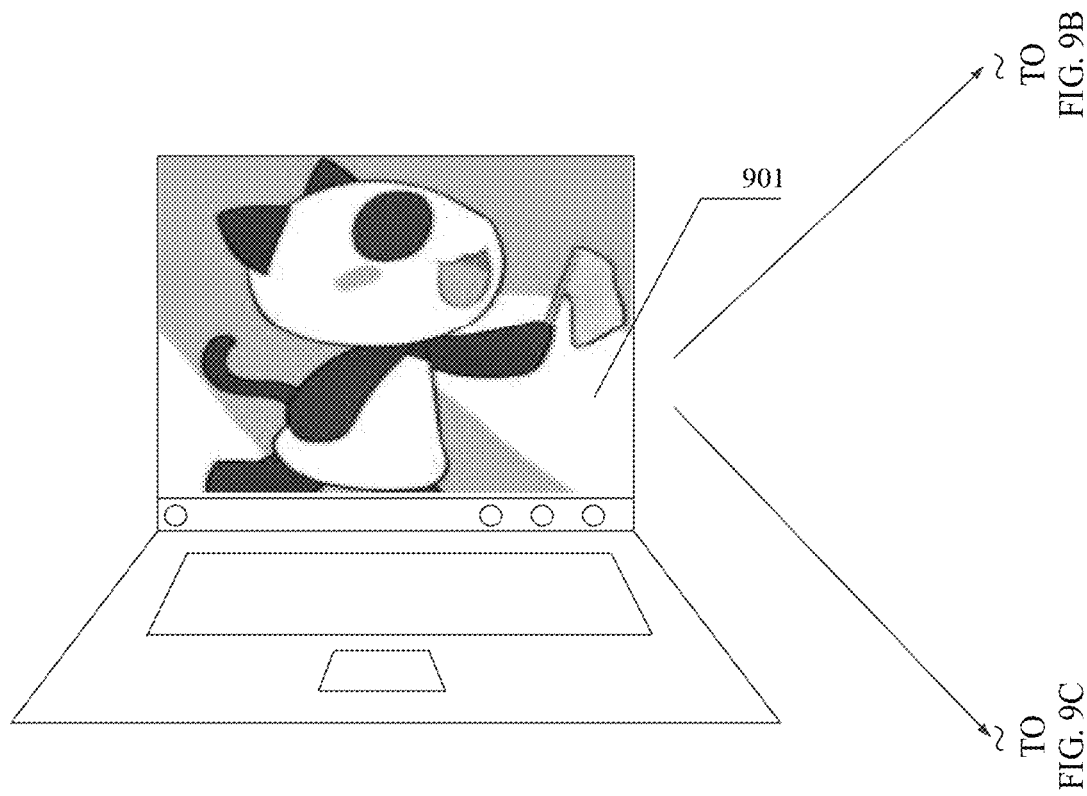
FIG. 9A to FIG. 9C are a diagram 1 of interfaces of a first terminal device and a second terminal device displayed before and after content transmission according to an embodiment of this disclosure.
Figure 9B:
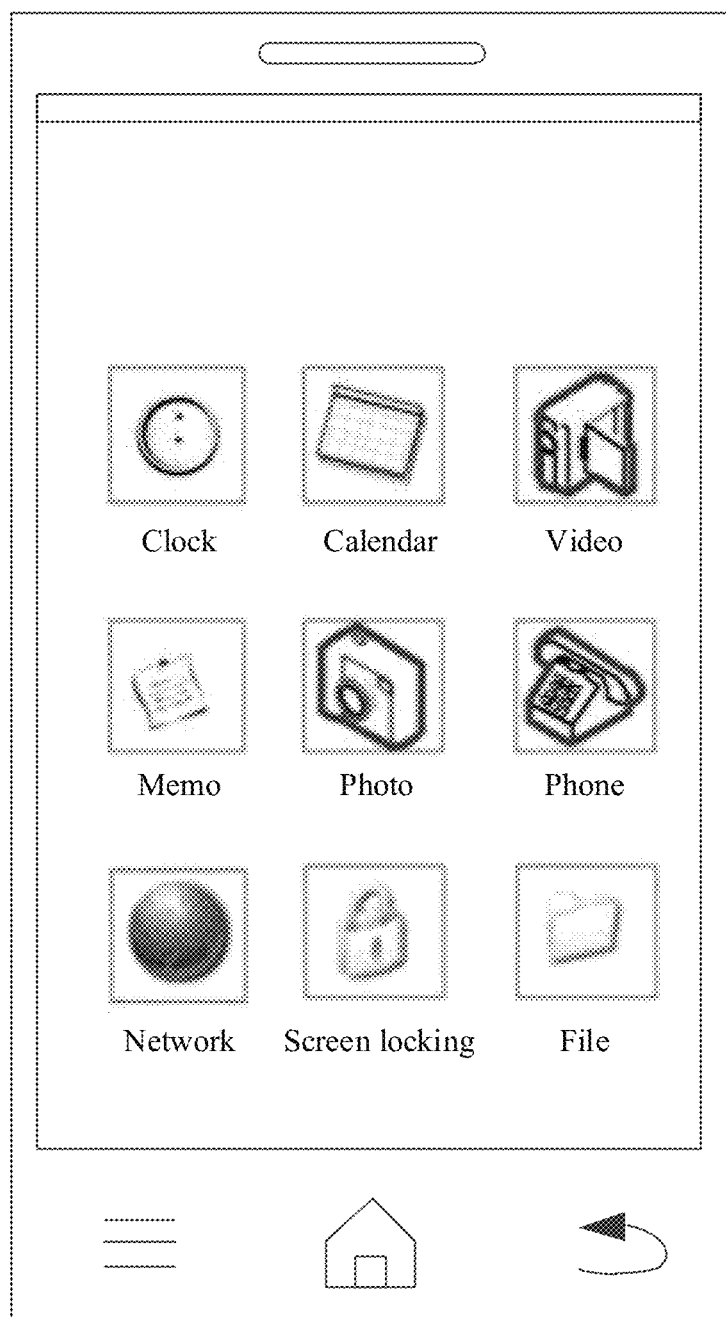
Figure 9C:
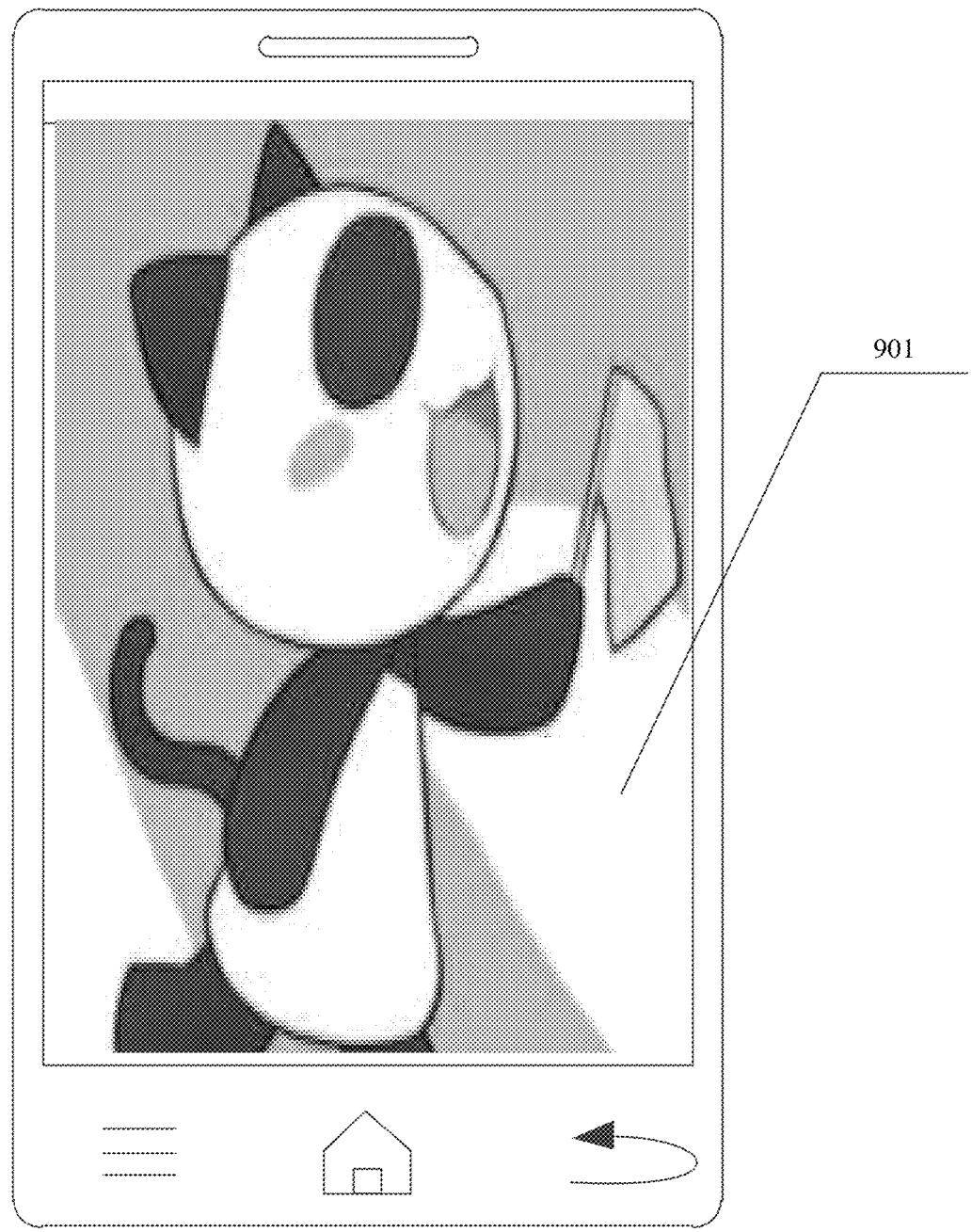

FIG. 9A to FIG. 9C are a diagram 1 of interfaces of a first terminal device and a second terminal device displayed before and after content transmission according to an embodiment of this disclosure.

As shown in FIG. 9A to FIG. 9C, before a PC transmits target content to a mobile phone, a first interface of the PC is a full-screen display interface of a picture 901, and the picture 901 is to-be-transmitted first content, as shown in FIG. 9A. A second interface of the mobile phone is a desktop, as shown in FIG. 9B. After the PC transmits the target content to the mobile phone, an interface of the PC is a display interface of the picture 901, and an interface of the mobile phone is also a full-screen display interface of the picture 901, as shown in FIG. 9C.

Figure 10A:
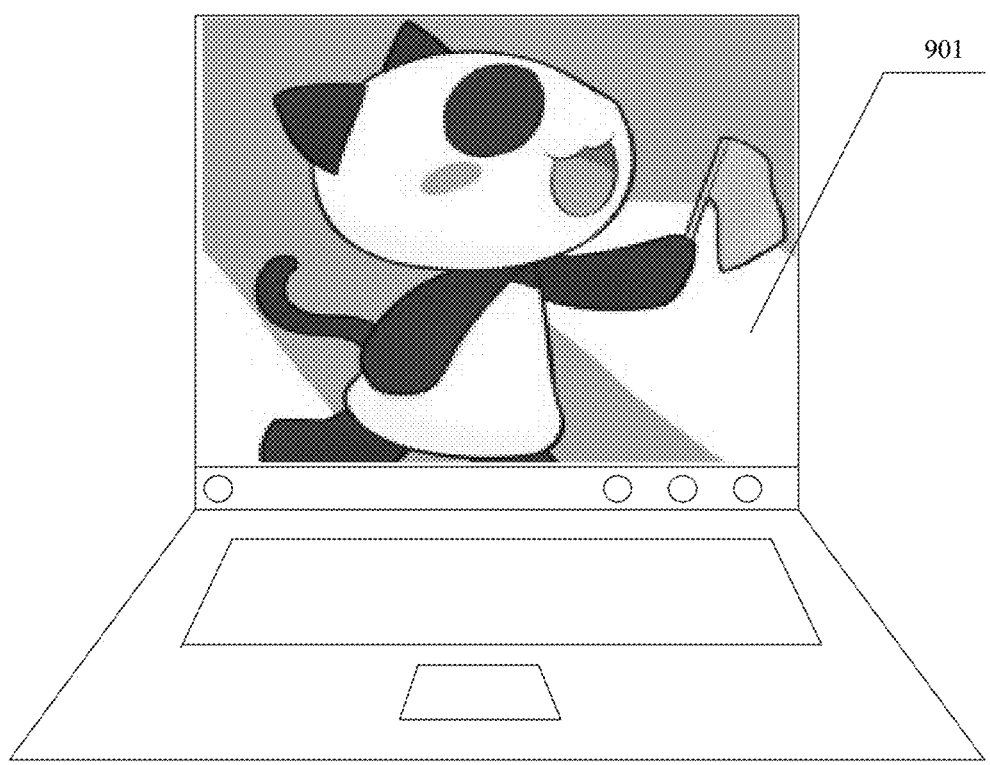
FIG. 10A to FIG. 10C are a schematic diagram of a scenario in which a content transmission direction is that a first terminal device transmits content to a second terminal device according to an embodiment of this disclosure.
Figure 10B:
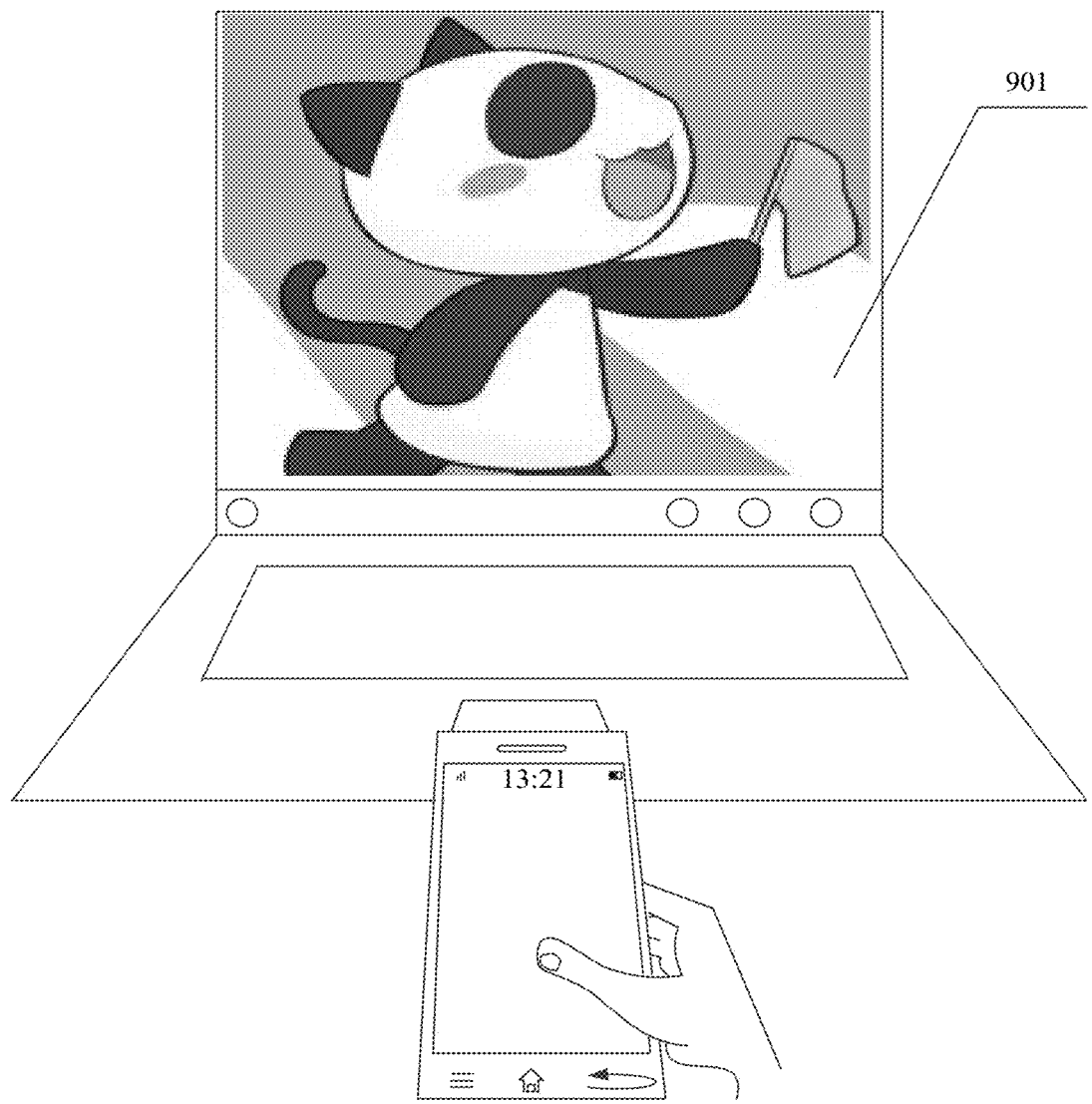
Figure 10C:
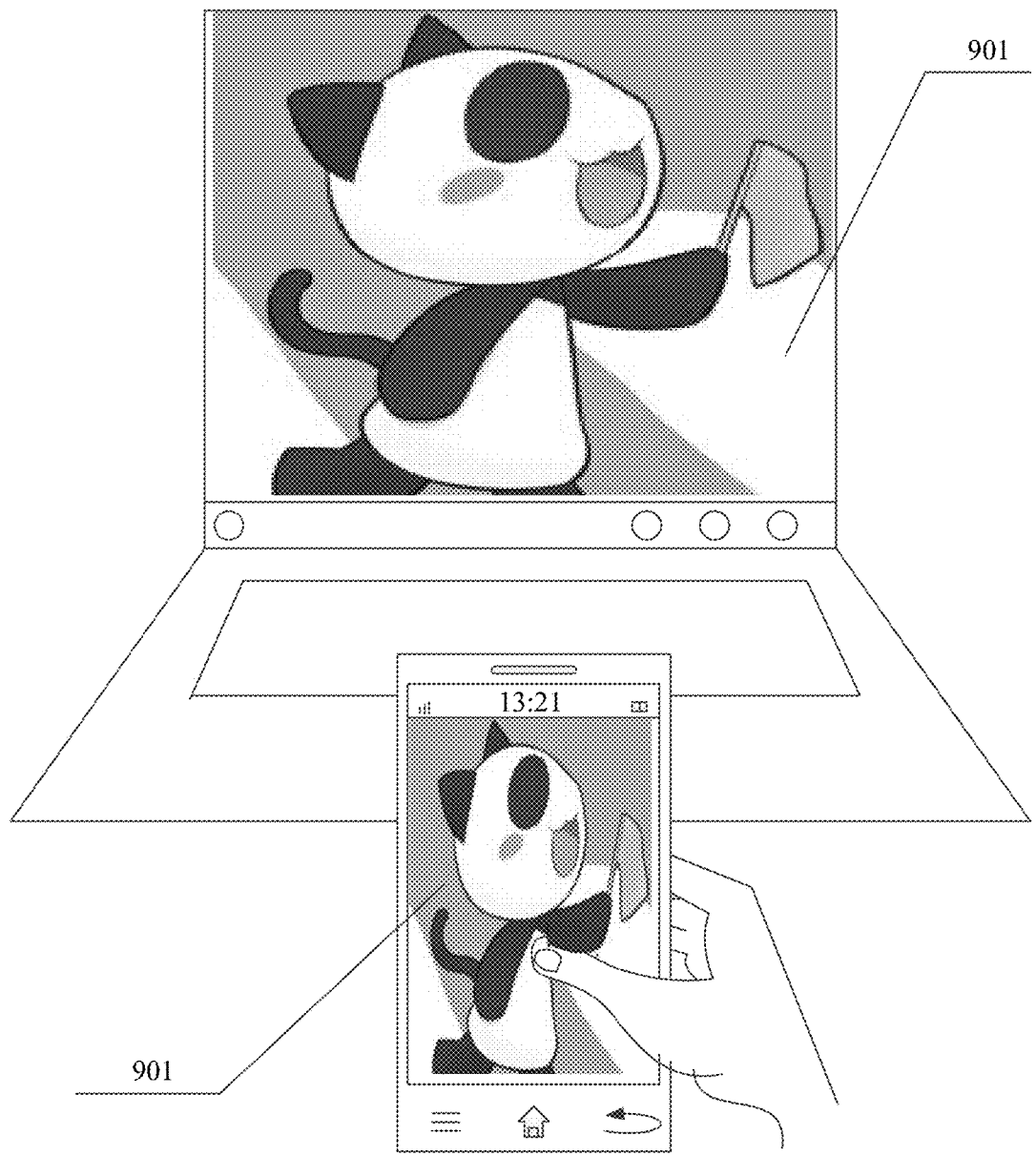

With reference to FIG. 10A to FIG. 10C, the following describes a content transmission method in a scenario in which a content transmission direction is that a first terminal device transmits content to a second terminal device.

FIG. 10A to FIG. 10C are a schematic diagram of a scenario in which a content transmission direction is that a first terminal device transmits content to a second terminal device according to an embodiment of this disclosure.

As shown in FIG. 10A, a first interface of a PC is a full-screen display interface of the picture 901, and a touchpad is disposed on the PC. As shown in FIG. 10B, a user controls a mobile phone to touch the touchpad of the PC, and the PC obtains a capacitance value change characteristic of the touchpad, and triggers a first instruction after determining that the capacitance value change characteristic of the touchpad matches a preset capacitance value change characteristic. The PC sends first information to the mobile phone in response to the first instruction, where the first information carries status information of a first interface. The mobile phone determines, based on the first information, that the PC transmits content to the mobile phone, and the mobile phone sends content transmission direction indication information to the PC. The PC sends the picture 901 to the mobile phone in response to the content transmission direction indication information. The phone displays the picture 901 in full screen.

When the content transmission direction is that the second terminal device transmits content to the first terminal device, step S411 to step S413 are performed.

Step S411: The second terminal device determines second content.

The second content is content that is in the second interface and that is most recently operated by the user.

A specific implementation is as follows.

(1) If the second interface includes no window, the second content sent to the first terminal device is the second interface.

(2) If the type of the second interface is a window interface, the second content sent to the first terminal device is content displayed in a window most recently operated by the user in the second interface. For example, the second interface includes one window, and a video play window is nested in the window. If an operation most recently performed by the user on the second interface is an operation performed on the video play window, (for example, the user opens the video play window or taps a pause icon in the video play window), the content displayed in the window most recently operated by the user in the second interface is a video played in the video play window. If an operation most recently performed by the user on the second interface is an operation performed on a part of the window other than the video play window, the content displayed in the window most recently operated by the user in the second interface is an interface of the window. It may be understood that, if the second interface includes one window, and no other window is nested in the window, a window most recently operated by the user in the second interface is the window included in the second interface.

(3) If the type of the second interface is a gallery interface and an operation most recently performed by the user on the second interface is opening the second interface, the second content sent to the first terminal device is the gallery interface, that is, the second interface. If the type of the second interface is a gallery interface and an operation most recently performed by the user on the second interface is selecting one or more pictures or one or more videos in the gallery, the second content sent to the first terminal device is the one or more pictures or the one or more videos selected by the user.

Step S412: The second terminal device sends the second content to the first terminal device.

In a manner, the second terminal device may send the second content to the first terminal device over BT or WI-FI.

Step S413: The first terminal device displays all or a part of the second content.

After receiving the second content, the first terminal device may display all or a part of the second content. A manner of displaying the second content on the second terminal device may be the same as or different from a manner of displaying the second content on the first terminal device.

For example, if the second content is one picture, and a manner of displaying the picture on the second terminal device is displaying an icon of the picture or displaying the picture in a full-screen view state or in a non-full-screen view state, the first terminal device displays the picture in a full-screen view state or in a non-full-screen view state after receiving the picture.

For another example, the second content includes a plurality of pictures, and a manner of displaying the plurality of pictures on the second terminal device is displaying respective icons of the plurality of pictures on a gallery interface. After receiving the pictures, the first terminal device displays, in a view state, a picture that is first received in the plurality of pictures. In this case, the current display interface of the first terminal device is a display interface of the picture that is first received. The current display interface of the first terminal device may further display the icons of the plurality of pictures. When the user taps an icon of any one of the plurality of pictures, the first terminal device displays the picture. Optionally, a current display interface of the first terminal device may further display transfer progresses of the plurality of pictures.

In another manner, the first terminal device may not display the second content. In this case, the first terminal device may display second reminder information used to indicate that the second content is received. The second reminder information may include a type of the received second content, and may further include an amount of received second content. For example, the second reminder information is "10 pictures are received."

Figure 11A:
FIG. 11A to FIG. 11C are a diagram 2 of interfaces of a first terminal device and a second terminal device displayed before and after content transmission according to an embodiment of this disclosure.
Figure 11B:
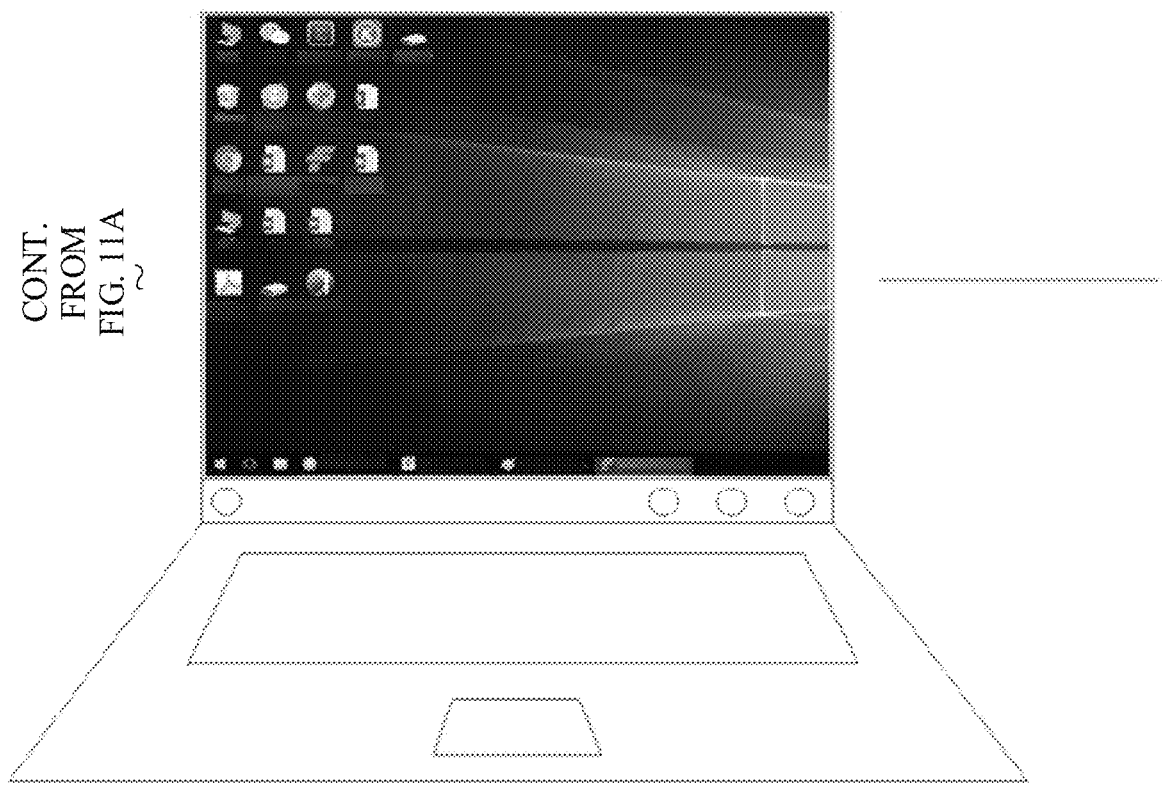
Figure 11C:
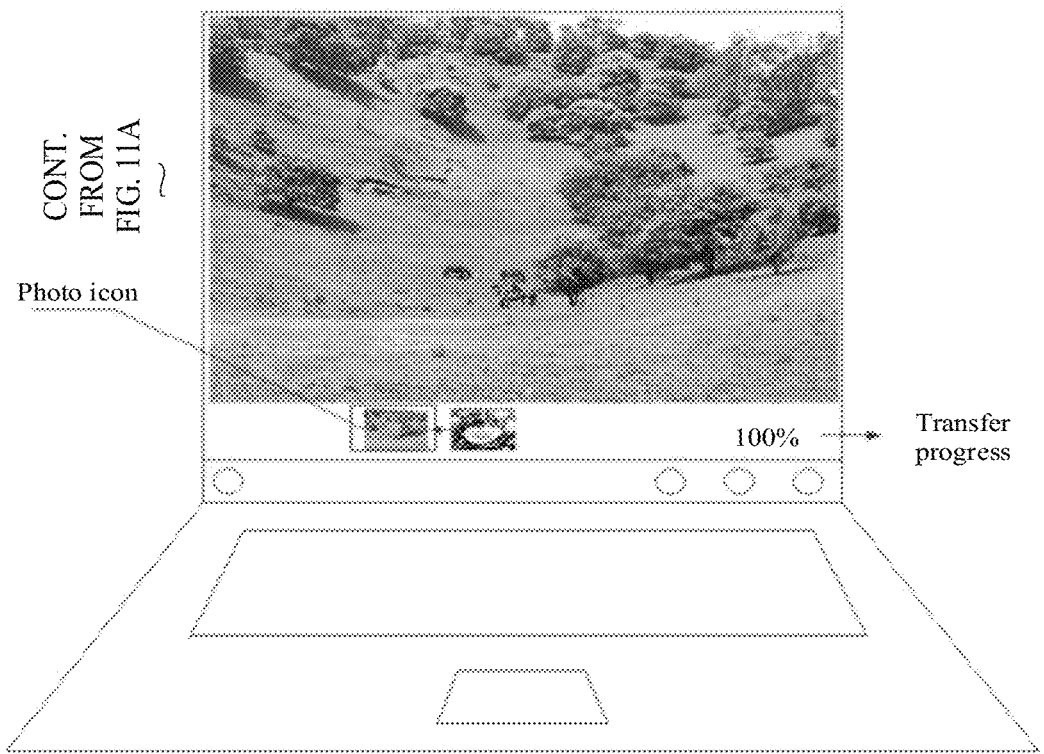

FIG. 11A to FIG. 11C are a diagram 2 of interfaces of a first terminal device and a second terminal device displayed before and after content transmission according to an embodiment of this disclosure.

As shown in FIG. 11A to FIG. 11C, before a mobile phone transmits second content to a PC, a second interface of the mobile phone is a gallery interface, two of pictures in the gallery interface are selected, and the two selected pictures are the to-be-transmitted second content, as shown in FIG. 11A. A first interface of the PC is a desktop, as shown in FIG. 11B After the mobile phone transmits the second content to the PC, a display interface of the PC displays the first picture (that is, the picture that is first received) in the two pictures in a view state, and the display interface of the PC further displays icons and transfer progresses of the two received pictures, as shown in FIG. 11C. The interface of the mobile phone remains unchanged, and is still the gallery interface.

It may be understood that information transmission between the first terminal device and the second terminal device may be implemented by using respective wireless communications modules 160.

In embodiments, a content transmission process is triggered by obtaining an instruction, without depending on an NFC function of a mobile phone, or setting an NFC tag on a PC, which achieves excellent applicability. In addition, the content transmission method in embodiments does not depend on a third-party application, social software, or a data cable. In this case, content transmission is highly efficient and easy to implement.

In addition, in this solution, the terminal device determines to-be-transmitted content and a content transmission direction. This improves content transmission efficiency, reduces user intervention, and improves user experience.

The foregoing describes the content transmission method in embodiments of this disclosure, and the following describes an apparatus in embodiments of this disclosure.

Figure 12:
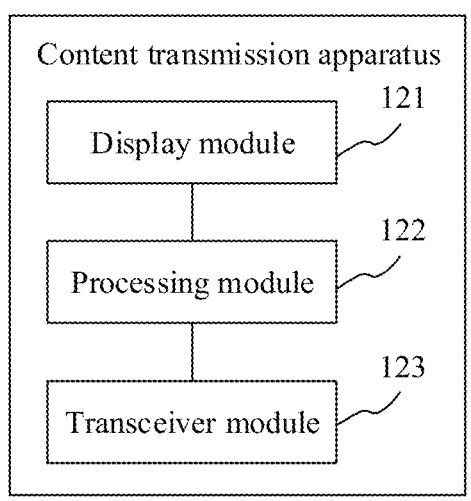
FIG. 12 is a schematic diagram of a structure of a content transmission apparatus according to an embodiment of this disclosure.

FIG. 12 is a schematic diagram of a structure of a content transmission apparatus according to an embodiment of this disclosure. As shown in FIG. 12, the content transmission apparatus includes a display module 121, a processing module 122, and a transceiver module 123.

A first implementation is as follows.

In this implementation, the display module 121 may perform S401 and S413 in the embodiment in FIG. 4A and FIG. 4B. The processing module 122 may perform S403, S404, and S408 in the embodiment in FIG. 4A and FIG. 4B. The transceiver module 123 may perform S405 and S409 in the embodiment in FIG. 4A and FIG. 4B.

The processing module 122 is configured to obtain a first instruction, where the first instruction indicates that the content transmission apparatus needs to perform content transmission with another terminal device. The processing module 122 is further configured to respond to the first instruction. The transceiver module 123 is configured to send first information to a second terminal device, where the first information is used by the second terminal device to determine that a content transmission direction is that the content transmission apparatus transmits content to the second terminal device. The transceiver module 123 is further configured to receive content transmission direction indication information from the second terminal device. The processing module 122 is further configured to determine first content. The transceiver module 123 is further configured to send the first content to the second terminal device, so that the second terminal device displays the first content. Alternatively, the processing module 122 is configured to obtain a first instruction, where the first instruction indicates that the content transmission apparatus needs to perform content transmission with another terminal device. The processing module 122 is further configured to respond to the first instruction. The transceiver module 123 is configured to send first information to a second terminal device, where the first information is used by the second terminal device to determine that a content transmission direction is that the second terminal device transmits content to the content transmission apparatus. The transceiver module 123 is further configured to receive second content from the second terminal device. The display module 121 is configured to display the second content.

Optionally, the first information includes status information of a first interface presented by the display of the content transmission apparatus, and the status information of the first interface includes at least one of a type of the first interface or a time at which the first interface is most recently operated.

Optionally, the first information further includes content transmission indication information, and the content transmission indication information indicates that content transmission needs to be performed between the second terminal device and the content transmission apparatus.

Optionally, the processing module 122 is configured to trigger the first instruction based on an operation of controlling, by a user, the second terminal device to perform an operation on the content transmission apparatus, or trigger the first instruction based on an operation performed by a user on the content transmission apparatus, or receive the first instruction entered by a user into the content transmission apparatus.

Optionally, the processing module 122 is configured to obtain an operation of controlling, by the user, the second terminal device to touch a first location of the content transmission apparatus, and trigger the first instruction if a capacitance value change characteristic of the first location that is caused by the operation matches a preset capacitance value change characteristic.

Optionally, the content transmission apparatus further includes a display. The first content is a first interface presented by the display module of the content transmission apparatus, or the first content is content in the first interface.

Optionally, the first content is content that is in the first interface and that is most recently operated.

Optionally, the second content is a second interface presented by the second terminal device, or the second content is content in the second interface.

Optionally, the second content is content that is in the second interface and that is most recently operated.

It should be noted that the content transmission apparatus provided in the first implementation may execute the technical solution corresponding to the first terminal device in the foregoing method embodiment. Implementation principles and beneficial effects of the content transmission apparatus are similar, and details are not described herein again.

A second implementation is as follows.

In this implementation, the display module 121 may perform S402 and S410 in the embodiment in FIG. 4A and FIG. 4B. The processing module 122 may perform S406 and S411 in the embodiment in FIG. 4A and FIG. 4B. The transceiver module 123 may perform S407 and S412 in the embodiment in FIG. 4A and FIG. 4B.

The transceiver module 123 is configured to receive first information from a first terminal device.

The processing module 122 is configured to determine, based on the first information, that a content transmission direction is that the first terminal device transmits content to the content transmission apparatus. The transceiver module 123 is further configured to send content transmission direction indication information to the first terminal device, where the content transmission direction indication information indicates the first terminal device to transmit content to the content transmission apparatus. The transceiver module 123 is further configured to receive first content from the first terminal device. The display module 121 is configured to display the first content.

Alternatively, the transceiver module 123 is configured to receive first information from a first terminal device. The processing module 122 is configured to determine, based on the first information, that a content transmission direction is that the content transmission apparatus transmits content to the first terminal device. The processing module 122 is further configured to determine second content. The transceiver module 123 is further configured to send the second content to the first terminal device, so that the first terminal device displays the second content.

Optionally, the first information includes status information of a first interface presented by the display of the first terminal device, and the status information of the first interface includes at least one of a type of the first interface or a time at which the first interface is most recently operated.

Optionally, the first information further includes content transmission indication information, and the content transmission indication information indicates that content transmission needs to be performed between the content transmission apparatus and the first terminal device.

Optionally, the processing module 122 is configured to determine, based on the first information, that a type of the first interface is different from a type of a second interface presented by the display of the content transmission apparatus, a priority of the type of the first interface is the same as a priority of the type of the second interface, and a first time at which the first interface is most recently operated is later than a second time at which the second interface is most recently operated, and determine that the content transmission direction is that the first terminal device transmits content to the content transmission apparatus, or determine, based on the first information, that a type of the first interface is different from a type of the second interface, and a priority of the type of the first interface is higher than a priority of the type of the second interface, and determine that the content transmission direction is that the first terminal device transmits content to the content transmission apparatus, or determine, based on the first information, that a type of the first interface is the same as a type of the second interface, and a first time at which the first interface is most recently operated is later than a second time at which the second interface is most recently operated, and determine that the content transmission direction is that the first terminal device transmits content to the content transmission apparatus.

Optionally, the processing module 122 is configured to determine, based on the first information, that a type of the first interface is different from a type of a second interface presented by the content transmission apparatus, a priority of the type of the first interface is the same as a priority of the type of the second interface, and a first time at which the first interface is most recently operated is earlier than a second time at which the second interface is most recently operated, and determine that the content transmission direction is that the content transmission apparatus transmits content to the first terminal device, or determine, based on the first information, that a type of the first interface is different from a type of the second interface, and a priority of the type of the first interface is lower than a priority of the type of the second interface, and determine that the content transmission direction is that the content transmission apparatus transmits content to the first terminal device, or determine, based on the first information, that a type of the first interface is the same as a type of the second interface, and a first time at which the first interface is most recently operated is earlier than a second time at which the second interface is most recently operated, and determine that the content transmission direction is that the content transmission apparatus transmits content to the first terminal device.

Optionally, before the processing module 122 is configured to determine, based on the first information, that the content transmission direction is that the first terminal device transmits content to the content transmission apparatus or that the content transmission direction is that the content transmission apparatus transmits content to the first terminal device, the processing module 122 is further configured to determine that the content transmission apparatus moves in a preset mode within preset duration before a receiving time of the first information.

Optionally, the first content is a first interface presented by the display module of the first terminal device, or the first content is content in the first interface.

Optionally, the first content is content that is in the first interface and that is most recently operated.

Optionally, the second content is a second interface presented by the content transmission apparatus, or the second content is content in the second interface.

Optionally, the second content is content that is in the second interface and that is most recently operated.

It should be noted that the content transmission apparatus provided in embodiments of this disclosure may execute the technical solution corresponding to the second terminal device in the foregoing method embodiment. Implementation principles and beneficial effects of the content transmission apparatus are similar, and details are not described herein again.

Figure 13:
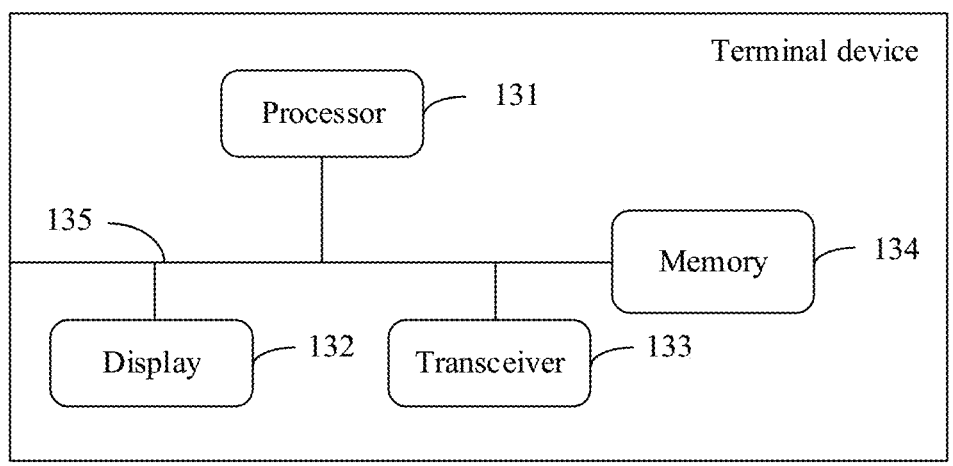
FIG. 13 is a schematic diagram of a structure of a terminal device according to an embodiment of this disclosure.

FIG. 13 is a schematic diagram of a structure of a terminal device according to an embodiment of this disclosure. As shown in FIG. 13, the terminal device may include a processor 131, a display 132, a transceiver 133, and a memory 134. The processor 131 executes program instructions in the memory 134. For example, the processor 131, the display 132, the transceiver 133, and the memory 134 may communicate by using a communications bus 135.

A first implementation is as follows.

The processor 131 may implement a function of the processing module 122 in the first implementation shown in FIG. 12, the display 132 may implement a function of the display module 121 in the first implementation shown in FIG. 12, and the transceiver 133 may implement a function of the transceiver module 123 in the first implementation shown in FIG. 12.

The processor 131 is configured to obtain a first instruction, where the first instruction indicates that the terminal device needs to perform content transmission with another terminal device. The processor 131 is further configured to respond to the first instruction. The transceiver 133 is configured to send first information to a second terminal device, where the first information is used by the second terminal device to determine that a content transmission direction is that the terminal device transmits content to the second terminal device. The transceiver 133 is further configured to receive content transmission direction indication information from the second terminal device. The processor 131 is further configured to determine first content. The transceiver is further configured to send the first content to the second terminal device, so that the second terminal device displays the first content. Alternatively, the processor 131 is configured to obtain a first instruction, where the first instruction indicates that the terminal device needs to perform content transmission with another terminal device. The processor 131 is further configured to respond to the first instruction. The transceiver 133 is configured to send first information to a second terminal device, where the first information is used by the second terminal device to determine that a content transmission direction is that the second terminal device transmits content to the terminal device. The transceiver 133 is further configured to receive second content from the second terminal device. The display 132 is configured to display the second content.

Optionally, the first information includes status information of a first interface presented by the display 132 of the terminal device, and the status information of the first interface includes at least one of a type of the first interface or a time at which the first interface is most recently operated.

Optionally, the first information further includes content transmission indication information, and the content transmission indication information indicates that content transmission needs to be performed between the second terminal device and the terminal device.

Optionally, the processor 131 is configured to trigger the first instruction based on an operation of controlling, by a user, the second terminal device to perform an operation on the terminal device, or trigger the first instruction based on an operation performed by a user on the terminal device, or receive the first instruction entered by a user into the terminal device.

Optionally, the processor 131 is configured to obtain an operation of controlling, by the user, the second terminal device to touch a first location of the terminal device, and trigger the first instruction if a capacitance value change characteristic of the first location that is caused by the operation matches a preset capacitance value change characteristic.

Optionally, the first content is a first interface presented by the display 132 of the terminal device, or the first content is content in the first interface.

Optionally, the first content is content that is in the first interface and that is most recently operated.

Optionally, the second content is a second interface presented by the display 132 of the second terminal device, or the second content is content in the second interface.

Optionally, the second content is content that is in the second interface and that is most recently operated.

It should be noted that the content transmission apparatus provided in the first implementation may execute the technical solution corresponding to the first terminal device in the foregoing method embodiment. Implementation principles and beneficial effects of the content transmission apparatus are similar, and details are not described herein again.

A second implementation is as follows.

The transceiver 133 is configured to receive first information from a first terminal device.

The processor 131 is configured to determine, based on the first information, that a content transmission direction is that the first terminal device transmits content to the terminal device. The transceiver 133 is further configured to send content transmission direction indication information to the first terminal device, where the content transmission direction indication information indicates the first terminal device to transmit content to the terminal device. The transceiver 133 is further configured to receive first content from the first terminal device. The display 132 is configured to display the first content.

Alternatively, the transceiver 133 is configured to receive first information from a first terminal device. The processor 131 is configured to determine, based on the first information, that a content transmission direction is that the terminal device transmits content to the first terminal device. The processor is further configured to determine second content. The transceiver is further configured to send the second content to the first terminal device, so that the first terminal device displays the second content.

Optionally, the first information includes status information of a first interface presented by the display of the first terminal device, and the status information of the first interface includes at least one of a type of the first interface or a time at which the first interface is most recently operated.

Optionally, the first information further includes content transmission indication information, and the content transmission indication information indicates that content transmission needs to be performed between the terminal device and the first terminal device.

Optionally, the processor 133 is configured to determine, based on the first information, that a type of the first interface is different from a type of a second interface presented by the display of the terminal device, a priority of the type of the first interface is the same as a priority of the type of the second interface, and a first time at which the first interface is most recently operated is later than a second time at which the second interface is most recently operated, and determine that the content transmission direction is that the first terminal device transmits content to the terminal device, or determine, based on the first information, that a type of the first interface is different from a type of the second interface, and a priority of the type of the first interface is higher than a priority of the type of the second interface, and determine that the content transmission direction is that the first terminal device transmits content to the terminal device, or determine, based on the first information, that a type of the first interface is the same as a type of the second interface, and a first time at which the first interface is most recently operated is later than a second time at which the second interface is most recently operated, and determine that the content transmission direction is that the first terminal device transmits content to the terminal device.

Optionally, the processor is configured to determine, based on the first information, that a type of the first interface is different from a type of a second interface presented by the terminal device, a priority of the type of the first interface is the same as a priority of the type of the second interface, and a first time at which the first interface is most recently operated is earlier than a second time at which the second interface is most recently operated, and determine that the content transmission direction is that the terminal device transmits content to the first terminal device, or determine, based on the first information, that a type of the first interface is different from a type of the second interface, and a priority of the type of the first interface is lower than a priority of the type of the second interface, and determine that the content transmission direction is that the terminal device transmits content to the first terminal device, or determine, based on the first information, that a type of the first interface is the same as a type of the second interface, and a first time at which the first interface is most recently operated is earlier than a second time at which the second interface is most recently operated, and determine that the content transmission direction is that the terminal device transmits content to the first terminal device.

Optionally, before the processor is configured to determine, based on the first information, that the content transmission direction is that the first terminal device transmits content to the terminal device or that the content transmission direction is that the terminal device transmits content to the first terminal device, the processor is further configured to determine that the terminal device moves in a preset mode within preset duration before a receiving time of the first information.

Optionally, the first content is a first interface presented by the display of the first terminal device, or the first content is content in the first interface.

Optionally, the first content is content that is in the first interface and that is most recently operated.

Optionally, the second content is a second interface presented by the display of the terminal device, or the second content is content in the second interface.

Optionally, the second content is content that is in the second interface and that is most recently operated.

It should be noted that the content transmission apparatus provided in embodiments of this disclosure may execute the technical solution corresponding to the second terminal device in the foregoing method embodiment. Implementation principles and beneficial effects of the content transmission apparatus are similar, and details are not described herein again.

An embodiment of this disclosure provides a storage medium. The storage medium is configured to store a computer program. The computer program is used to implement the content transmission method in the foregoing embodiments.

An embodiment of this disclosure provides a chip. The chip is configured to support a terminal device (for example, the first terminal device in the method embodiment) in implementing functions (for example, presenting a first interface, responding to a first instruction, and sending first information) described in embodiments of this disclosure. The chip is used in a chip system. The chip system may include the chip, or may include a chip and another discrete component. When the foregoing methods are implemented by using a chip in a terminal device, the chip includes a processing unit. Further, the chip may further include a communications unit. The processing unit may be, for example, a processor. When the chip includes the communications unit, the communications unit may be, for example, an input/output interface, a pin, or a circuit. The processing unit performs all or some of actions performed by each processing module (for example, the processing module in FIG. 12) in embodiments of this disclosure, and the communications unit may perform a corresponding receiving or sending action, for example, send first information to a second terminal device. In another specific embodiment, a processing module of the terminal device in this disclosure may be the processing unit of the chip, and a transceiver module of the terminal device may be the communications unit of the chip.

All or some of the steps in the method embodiments may be implemented by a program instructing related hardware. The foregoing program may be stored in a readable memory. When the program is executed, the steps of the foregoing method embodiments are performed. The foregoing memory (storage medium) includes a read-only memory (ROM), a RAM, a flash memory, a hard disk, a solid-state drive, a magnetic tape, a floppy disk, an optical disc, and any combination thereof.

Embodiments of this disclosure are described with reference to the flowcharts and/or block diagrams of the method, the device (system), and the computer program product according to embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processing unit of another programmable data processing device to generate a machine, so that instructions executed by the computer or the processing unit of the other programmable data processing device generate an apparatus for implementing a specific function in one or more processes in the flowcharts and/or in one or more blocks in the block diagrams.

The computer program instructions may be stored in a computer-readable memory that can indicate the computer or the other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the other programmable data processing device, so that a series of operations and steps are performed on the computer or the other programmable device, to generate computer-implemented processing. Therefore, the instructions executed on the computer or the other programmable device provide steps for implementing a specified function in one or more processes in the flowcharts and/or in one or more blocks in the block diagrams.

It is clear that a person skilled in the art can make various modifications and variations to embodiments of this disclosure without departing from the spirit and scope of this disclosure. This disclosure is intended to cover these modifications and variations of embodiments of this disclosure provided that they fall within the scope of the claims of this disclosure and equivalent technologies thereof.

In this disclosure, the term "include" and variations thereof may mean non-limitative inclusion. The term "or" and variations thereof may mean "and/or". In this disclosure, the terms "first", "second", and the like are intended to distinguish between similar objects but do not necessarily indicate a specific order or sequence. In this disclosure, "a plurality of" means two or more than two. The term "and/or" describes an association relationship between associated objects and represents that three relationships may exist. For example, A and/or B may represent the following three cases: only A exists, both A and B exist, and only B exists. The character "/" generally indicates an "or" relationship between associated objects.

What is claimed is:

1. A method implemented by a first terminal device, wherein the method comprises:
   obtaining an instruction instructing the first terminal device to perform a content transmission with a second terminal device;
   sending, to the second terminal device and in response to the instruction, first information to enable the second terminal device to determine that a content transmission direction is from the first terminal device to the second terminal device, wherein the first information comprises status information of an interface of the first terminal device, and wherein the status information comprises at least one of a type of the interface or a time at which the interface is most recently operated;
   receiving, from the second terminal device, content transmission direction indication information;
   determining based on the content direction indication information, first content; and
   sending, to the second terminal device, the first content to enable the second terminal device to display the first content.

2. The method of claim 1, wherein the first information further comprises content transmission indication information indicating that the content transmission needs to be performed between the second terminal device and the first terminal device.

3. The method of claim 1, further comprising triggering, based on a first operation of controlling, by a user, the second terminal device to perform a second operation on the first terminal device, the instruction.

4. The method of claim 3, further comprising:
   obtaining a third operation of controlling, by the user, the second terminal device to touch a location of the first terminal device; and
   further triggering the instruction when a capacitance value change characteristic of the location has matched a preset capacitance value change characteristic.

5. The method of claim 1, further comprising triggering, based on an operation performed by a user on the first terminal device, the instruction.

6. The method of claim 1, further comprising receiving, from a user into the first terminal device, the instruction.

7. The method of claim 1, wherein the first content is either an interface of the first terminal device or second content in the interface.

8. The method of claim 7, wherein the first content is third content that is in the interface and that is most recently operated.

9. A method implemented by a first terminal device, wherein the method comprises:
   obtaining an instruction instructing the first terminal device to perform a content transmission with a second terminal device;
   sending, to the second terminal device and in response to the instruction, first information indicating the second terminal device to determine that a content transmission direction is from the second terminal device to the first terminal device, wherein the first information comprises status information of a first interface of the first terminal device, and wherein the status information comprises at least one of a type of the first interface or a time at which the first interface is most recently operated;
   receiving, from the second terminal device, first content; and
   displaying the first content.

10. The method of claim 9, wherein the first content is either a second interface of the second terminal device or second content in the second interface.

11. The method of claim 10, wherein the first content is third content that is in the second interface and that is most recently operated.

12. A first terminal device comprising:
    one or more processors configured to obtain an instruction instructing the first terminal device to perform a content transmission with a second terminal device; and
    a transceiver coupled to the one or more processors and configured to:
       send, to the second terminal device, first information indicating the second terminal device to determine that a content transmission direction is from the first terminal device to the second terminal device, wherein the first information comprises status information of a first interface of the first terminal device, and wherein the status information comprises at least one of a type of the first interface or a time at which the first interface is most recently operated;
       receive, from the second terminal device, content transmission direction indication information;
       determine, based on the content direction indication information, first content; and
       send the first content to the second terminal device to enable the second terminal device to display the first content.

13. The first terminal device of claim 12, wherein the first information further comprises content transmission indication information indicating that the content transmission needs to be performed between the second terminal device and the first terminal device.

14. The first terminal device of claim 12, wherein the one or more processors are further configured to:
    trigger, based on a first operation of controlling, by a user, the second terminal device to perform a second operation on the first terminal device, the instruction;
    trigger, based on a third operation performed by the user on the first terminal device, the instruction; or
    receive, from the user into the first terminal device, the instruction.

15. The first terminal device of claim 14, wherein the one or more processors are further configured to:
- obtain a fourth operation of controlling, by the user, the second terminal device to touch a location of the first terminal device; and
- further trigger the instruction when a capacitance value change characteristic of the location that is caused by the fourth operation has matched a preset capacitance value change characteristic.

16. The first terminal device of claim 12, further comprising a display coupled to the one or more processors, and wherein the first content is an interface of the display or second content in the interface.

17. The first terminal device of claim 16, wherein the first content is third content that is in the interface and that is most recently operated.

18. The method of claim 9, further comprising triggering, based on an operation performed by a user on the first terminal device, the instruction.

19. The method of claim 9, further comprising receiving, from a user into the first terminal device, the instruction.

20. The first terminal device of claim 12, further comprising triggering, based on an operation performed by a user on the first terminal device, the instruction.

* * * * *

UNITED STATES PATENT AND TRADEMARK OFFICE
CERTIFICATE OF CORRECTION

| | | |
|---|---|---|
| PATENT NO. | : 11,893,302 B2 | Page 1 of 1 |
| APPLICATION NO. | : 17/732145 | |
| DATED | : February 6, 2024 | |
| INVENTOR(S) | : Wujian Liu and Guoqiang Liu | |

It is certified that error appears in the above-identified patent and that said Letters Patent is hereby corrected as shown below:

On the Title Page

Under item (56), FOREIGN PATENT DOCUMENTS, Line 1:
CN 110224920 A 9/2010 should read CN 110224920 A 9/2019

Under item (56), FOREIGN PATENT DOCUMENTS, Line 2:
CN 102377877 A 3/2013 should read CN 102377877 A 3/2012

Signed and Sealed this
Second Day of April, 2024

Katherine Kelly Vidal
*Director of the United States Patent and Trademark Office*